United States Patent [19]

Messenger et al.

[11] Patent Number: 5,051,947

[45] Date of Patent: * Sep. 24, 1991

[54] HIGH-SPEED SINGLE-PASS TEXTUAL SEARCH PROCESSOR FOR LOCATING EXACT AND INEXACT MATCHES OF A SEARCH PATTERN IN A TEXTUAL STREAM

[75] Inventors: Charles H. Messenger; Robert E. Heiss, Jr., both of Redondo Beach, Calif.

[73] Assignee: TRW Inc., Redondo Beach, Calif.

[*] Notice: The portion of the term of this patent subsequent to Jul. 26, 2005 has been disclaimed.

[21] Appl. No.: 807,903

[22] Filed: Dec. 10, 1985

[51] Int. Cl.⁵ .............................................. G06F 15/40
[52] U.S. Cl. .............................. 364/900; 364/963.1; 364/956.1; 364/947.2; 340/146.2
[58] Field of Search ... 364/900 MS File, 200 MS File, 364/300, 418, 419, 728, 769; 382/39, 40, 57

[56] References Cited

U.S. PATENT DOCUMENTS

| | | | |
|---|---|---|---|
| 4,094,001 | 6/1978 | Miller | 364/900 |
| 4,205,302 | 5/1980 | Godo | 340/146.2 |
| 4,433,392 | 2/1984 | Beaven | 364/900 |
| 4,450,520 | 5/1984 | Hollaar et al. | 364/200 |
| 4,531,201 | 7/1985 | Skinner, Jr. | 364/900 |
| 4,550,436 | 10/1985 | Freeman et al. | 382/34 |
| 4,575,795 | 3/1986 | Boothroyd et al. | 364/200 |
| 4,625,295 | 11/1986 | Skinner | 364/900 |
| 4,674,066 | 6/1987 | Kucera | 364/900 |
| 4,747,072 | 5/1988 | Robinson et al. | 364/900 |
| 4,760,523 | 7/1988 | Yu et al. | 364/200 |

Primary Examiner—Gareth D. Shaw
Assistant Examiner—Maria Napiorkowski

[57] ABSTRACT

A high speed search processor capable of performing a wide variety of search functions, including simple and complex searches, either within an entire text stream or within predefined fixed or sliding windows in the text stream. The processor is made up of multiple interconnected cells, each of which has a pattern register for storing part of a pattern to be searched for, a character register for storing a character of the data stream to be searched, a match register for storing a match value indicative of a match between the search pattern and the text stream, and match logic for modifying an incoming match value in accordance with conditions within the cell. The data stream and the search pattern are oppositely oriented, such that a first character of the search pattern is first encountered by a first character in the data stream, and the pattern is successively compared with an equal number of characters in the data stream as it is moved through the search pattern. The match logic includes means for detecting missing and extra characters in the data stream. The processor can therefore tolerate incorrect, missing or extra characters in the text stream, and can handle multiple levels of nesting and arbitrary boolean expressions within the search pattern. Another novel aspect of the processor is its ability to locate an enumerated subset of search terms or patterns within fixed or sliding windows.

38 Claims, 23 Drawing Sheets

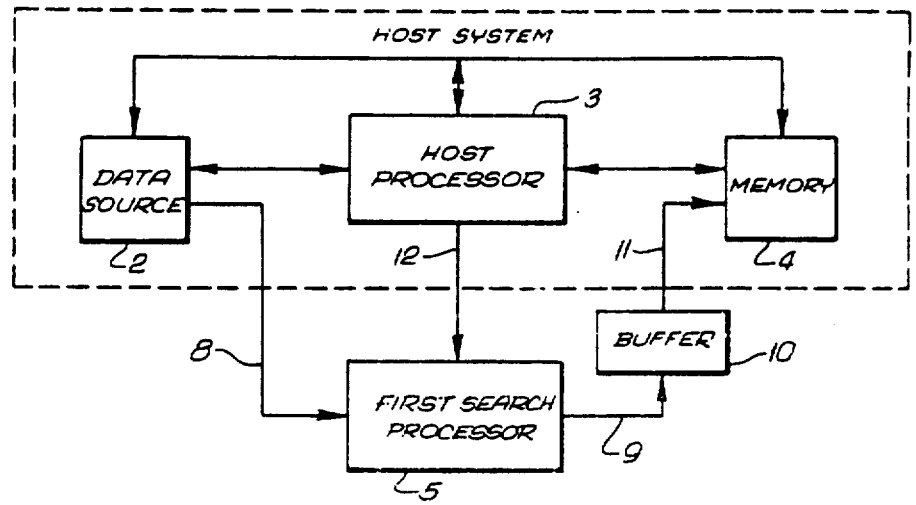
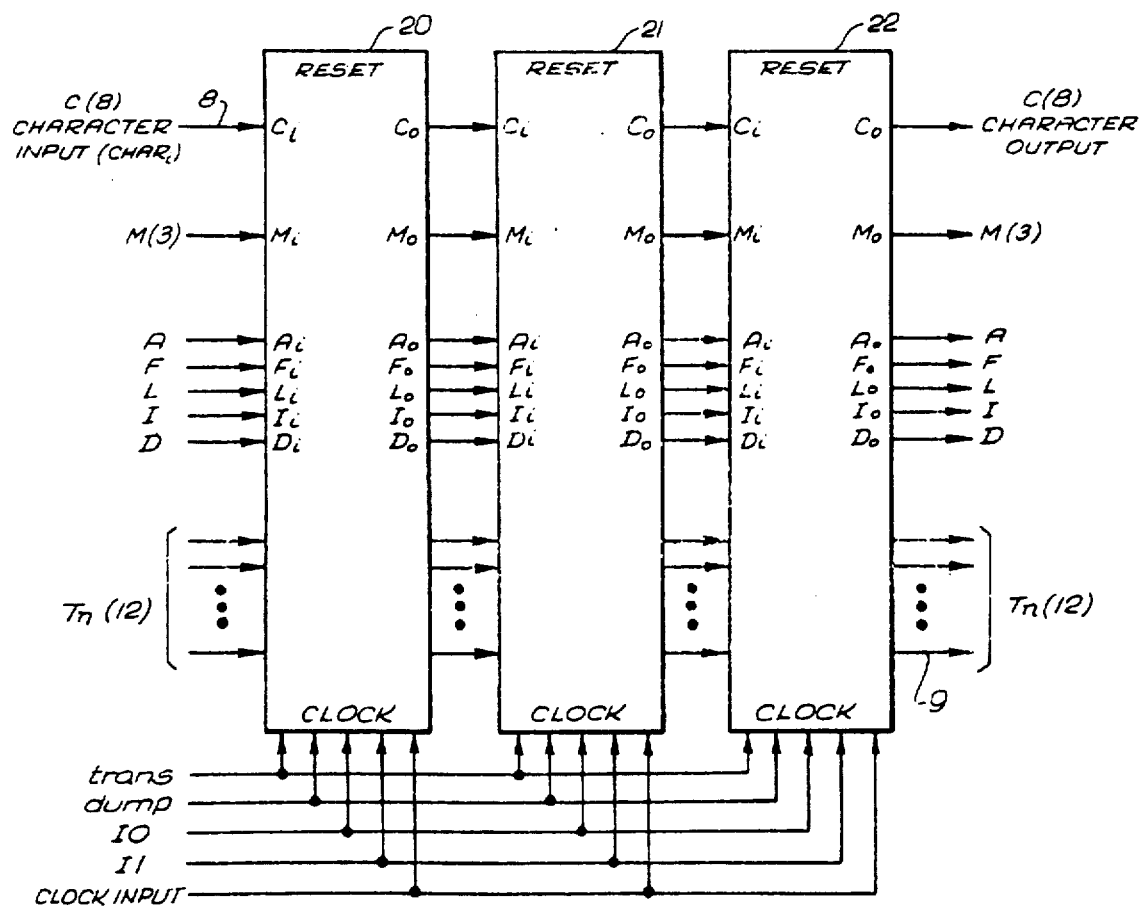

(EXACT MATCH)

(MISSING CHAR.)

Fig. 3c
(EXTRA CHAR)

Fig. 3d
(INCORRECT CHAR.)

(EXACT MATCH, TOL=2)

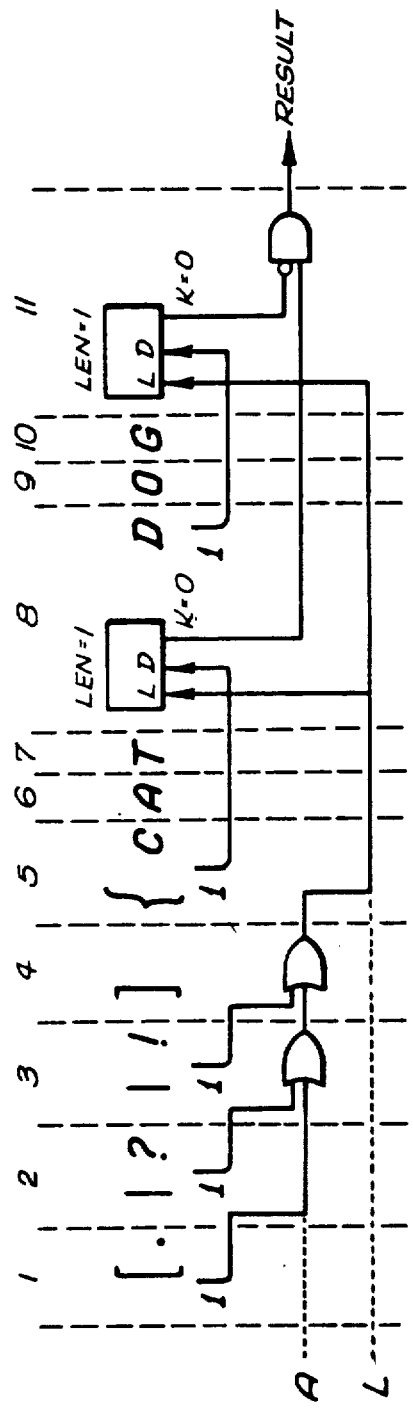

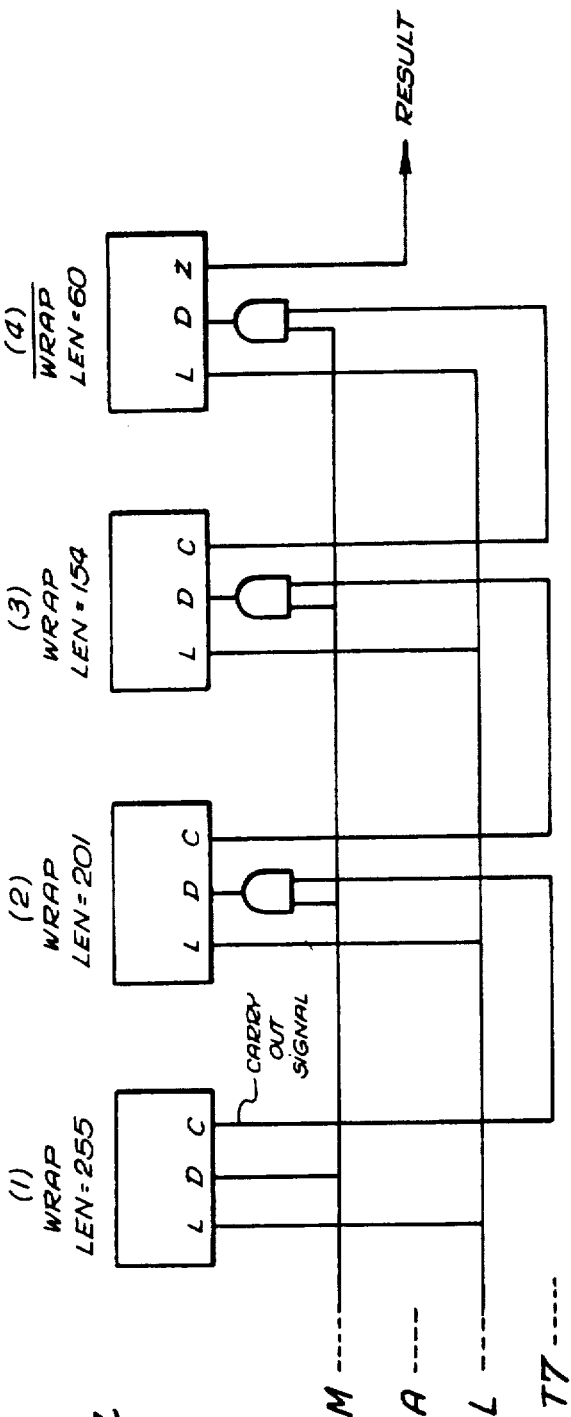

HIGH-SPEED SINGLE-PASS TEXTUAL SEARCH PROCESSOR FOR LOCATING EXACT AND INEXACT MATCHES OF A SEARCH PATTERN IN A TEXTUAL STREAM

CROSS-REFERENCE TO RELATED APPLICATIONS

This application is related to application Ser. No. 726,457, filed on Apr. 24, 1985, now U.S. Pat. No. 4,760,523, issued July 26, 1988, entitled "A Fast Search Processor," which is a continuation-in-part of application Ser. No. 626,432, filed on June 29, 1984, now abandoned and having the same title.

BACKGROUND OF THE INVENTION

This invention relates generally to information processing systems, and more specifically, to special-purpose processors for searching data bases to locate particular patterns of data. This type of processing arises in a number of different contexts, but can be best understood in terms of a search of a data base to locate all the occurrences of a particular word or phrase. In the past, computer software running on conventional hardware has been used to perform such searching, but has been found to suffer from a number of practical limitations.

Conventional hardware for sequentially searching a large data base from beginning to end is likely to take so much time as to be totally impractical, and various software techniques have been used to organize the data in such a way that the system has relatively good performance for what is considered a typical search. These techniques usually involve some type of indexing scheme, in which large tables contain the location or locations of every item in the data base. These index tables may be comparable in size to the actual data base, and they are often cumbersome to build and organize. Moreover, a system that requires indexing tables is inconvenient to use for searching data bases of which the content may vary with time.

Even with the use of index structures, software searching is very much dependent on the number and complexity of search conditions imposed for a given search task, and the general-purpose computer employed has an operating system overhead that further slows the searching process. As a result, actual data processing rates that can be obtained are usually only a fraction of the maximum data rates of mass storage devices on which data bases are usually stored.

Because of the limitations of software-controlled searching techniques, hardware devices to aid in the searching process have been devised. These fall into two categories: content-addressable memories and special-purpose processors. Content-addressable memories are memory devices capable of comparing their contents with a pattern presented on a common bus. Such memories are prohibitively expensive for large data bases, and, in any event, have limited utility, since they are typically capable of performing only exact match operations.

Special-purpose processors for data searching employ low-cost memory from which data is accessed by dedicated pattern-matching circuitry. The search conditions are typically stored in the processor prior to the search, and data is fed into the processor during the search. A particularly desirable form of a special purpose processor incorporates all of its logic onto a single integrated-circuit chip, with an expansion capability based on the use of several interconnected chips.

One such processor, by Mead and associates at the California Institute of Technology, uses a 128-bit comparator to compare text input with a resident pattern. (See Mead, C. A., Pashley, R. D., Britton, L. D., Daimon, Y. T., and Sando, S. F. "128-bit Multi-Comparator," *IEEE Journal Solid State Circuits*, SC-11(5):692-695, October, 1976). A mask register allows the equivalent of variable-length "don't care" characters in the pattern. In other words, the pattern may be designated as containing a variable-length segment, the content of which does not affect the matching process.

Foster and Kung have proposed a systolic pattern-matching chip consisting of two kinds of cells. (See Foster, M. J., and Kung, H. T. "The Design of Special-Purpose VLSI Chips," *IEEE Computer*, 13(1), January, 1980). The processor does not store the pattern being searched for, requiring its recirculation along a parallel data path to the data being searched. The systolic nature of this processor, which implies a pipeline of interconnected cells with each cell only sharing signals with its immediate neighbors, makes it particularly adaptable to high density layout in integrated circuits.

A second systolic design was proposed by Mukhopadhyay of the University of Central Florida with a structure including a pipeline of a single type of cell. (See Mukhopadhyay, A., "VLSI Hardware Algorithms," In Rabbat, G. (editor), *Hardware and Software Concepts in VLSI*, ch. 4, pp. 72-94, Van Nostrand Reinhold, 1983). In this system, a pattern is loaded in from one end of the pipeline and text data to be searched is loaded in from the opposite end. The system allows both fixed-length and variable-length "don't care" characters.

Even though these and other proposed systems perform pattern matching at high speeds with various "don't care" capabilities, they do not represent complete data search systems. For example, these systems do not perform Boolean functions, complex proximity functions, or handle approximate matches. Accordingly, a system built around such devices would have an unpredictable response time, depending on whether or not the special hardware could be used in any particular search query. This is, in many ways, the same problem that faces traditional software solutions.

The cross-referenced applications, which are not prior art with respect to the present invention, represented a significant step forward in the solution of the problems associated with the prior art. However, the system disclosed and claimed in the cross-referenced applications is limited in some important respects. In particular, the earlier system could handle a limited number of mis-spellings in the text being searched, but was unable to deal with missing or extra characters in the text. Without the ability to handle missing or extra characters, a search pattern with only minor mis-spelling could be missed in the text search.

It will be appreciated that there is still room for improvement over the system disclosed and claimed in the cross-referenced applications. Ideally, a search processor should have the capability of recognizing search patterns even if the text contains a limited number of extra characters or missing characters, as well as mis-spellings with the correct number of characters. The present invention is directed to this end, and to providing a high-speed text-searching system capable of performing a large number of different search functions.

SUMMARY OF THE INVENTION

The present invention resides in a fast search processor, and a related method for its use, capable of performing a wide variety of search functions, including recognizing search patterns with missing or extra characters. Another important aspect of the invention is the ability to search a text stream in regions called segments, which may be, for example, sentences, pages of text, or a selected number of contiguous characters or words. A sentence and a page are examples of "fixed" segments or windows. A search could specify various combinations of patterns that must be found within a segment, such as a sentence. If the search were to specify a combination of patterns to be located within any contiguous 200 characters of each other, this would be an example of a search using a "sliding" segment or window.

The search processor of the invention is capable of performing an "enumerated match" function within a specified segment. An enumerated match is defined as a search condition which specifies that the search processor will report a match only if the number of occurrences of a pattern within a text segment is greater than, less than or equal to a specified number.

The search processor is also capable of performing an "enumerated subset" function, which means that a match is reported if there are a designated number of occurrences of various patterns selected from a set, or list, of search patterns. For example, a search could be defined to locate at least two of a set of three search terms 'a', 'b' and 'c' within a specified segment, or to locate two terms from the set consisting of "at least three 'a'", "at least four 'b'", and "at most one 'c'". The complexity of a search can be further extended by including boolean expressions as search terms, and by further nesting enumerated subsets within the search terms of other enumerated subsets. As will become apparent from the more detailed description, the search processor of the invention is an extremely powerful search tool, capable of searching for text patterns from the most simple to the most complex nature, at extremely high speed.

The hardware employed in the search processor comprises a plurality of serially-connected cells, each cell including a pattern register for storing part of a pattern to be searched for, a character register for storing a character of a data stream to be searched, and comparator means for comparing the contents of the character register and the pattern register. The character registers of the cells are serially connected to form a character line.

Each cell also includes a match register for storing a quantity indicative of a match between the pattern register and the character register, the match registers being connected from cell to cell to form a match line. According to one aspect of the invention, the match logic includes means for detecting missing and extra characters in the textual stream being searched. Each cell also preferably includes an accumulator register for accumulating match data derived during operation of the system, a counter used in some types of search functions, and a plurality of other registers used in various search functions. The structure of all of the cells is identical, and like registers are connected together in serial strings.

Expressed in general terms, the search processor of the invention comprises means for storing a search pattern in a serially connected plurality of comparison cells, means for passing the text stream through the comparison cells, and means for detecting exact matches between the text stream and the search pattern. The processor also includes means for selectively detecting inexact matches between the text stream and the search pattern, preferably including, to a limited and preselected extent, the presence of incorrect and extra characters in the text stream and the absence of characters from the text stream, and means for generating match signals indicative of the exact and inexact matches, for output from the serially connected cells in synchronism with the text stream.

More specifically, according to one aspect of the invention, the processor further includes means for storing a first match result associated with a first search term on an additional line connecting the cells, means for generating a second match result relating to a second search term, and means for logically combining the first and second match results for output from the serially connected cells. The processor may also include means for generating additional match results associated with additional search terms, which may be logically combined with the first and second search terms in a nested arrangement.

The processor of the invention may also include means for counting the number of occurrences of selected search terms, to provide for the searching of enumerated conditions within the text stream. For fixed-window searching, the processor further includes means for detecting boundaries of predefined text segments within the text stream and means for enabling the search functions to be performed only within a fixed window of one text segment.

According to another aspect of the invention, which performs searching within sliding windows, the processor of the invention also includes means for detecting the boundaries of predefined text segments within the text stream, means for counting the number of segments to determine whether a search term has appeared within a specified number of text segments, and means for generating a match signal only when the specified search terms have appeared in combination within the specified number of text segments. The processor may also include means for reducing the number of match signals generated by ANDing the match signals with a signal derived from the boundaries of the segments.

In terms of a novel method of searching a stream of text for specified search patterns, the invention comprises the steps of storing a search pattern in a serially connected plurality of comparison cells, passing the text stream through the comparison cells, detecting exact matches between the text stream and the search pattern, selectively detecting inexact matches between the text stream and the search pattern, preferably including, to a limited and preselected extent, the presence of incorrect and extra characters in the text stream and the absence of characters from the text stream, and generating match signals indicative of the exact and inexact matches, for output from the serially connected cells in synchronism with the text stream.

The method may also include the steps of storing a first match result associated with a first search term on an additional line connecting the cells, generating a second match result relating to a second search term, and logically combining the first and second match results for output from the serially connected cells. Preferably, the method further includes the step of generating additional match results associated with additional search terms, which may be logically combined with the first and second search terms in a nested arrangement.

For some types of search, the method may also include the step of counting the number of occurrences of selected search terms, to provide for the searching of enumerated conditions within the text stream.

For searching within a fixed window of a predefined text segment, the method may include the steps of detecting boundaries of predefined text segments within the text stream, and enabling the search functions to be performed only within a fixed window of one text segment. For searching within a sliding segment of text the method also includes the steps of detecting the boundaries of predefined text segments within the text stream, counting the number of segments to determine whether a search term has appeared within a specified number of text segments; and generating a match signal only when the specified search terms have appeared in combination within the specified number of text segments. This aspect of the invention may also involve reducing the number of match signals generated by ANDing the match signals with a signal derived from the boundaries of the segments.

Another aspect of the invention concerns the ability to program the cells in such a way as to effectively extend the limited length of a counter in each cell to an arbitrarily large counter. In the illustrative embodiment of the invention, the counter in each cell is limited to eight bits in length, but adjacent cells can be employed to provide a counter of larger size, such as thirty-two bits. In this manner, the small counter size in each cell does not limit the ability of the processor to perform a variety of search involving keeping counts of large numbers of characters, words or sentences.

Another aspect of the invention concerns the collection of results from the processor. The processor requires that text be passed through it in a serial fashion, and match indication signals emerge from the processor in synchronism with the text and on a line that parallels the character line. Multiple search queries may be handled by placing the multiple search results on additional lines through the processor. However, the number of queries that can be handled in this manner is limited by the number of lines provided by the processor cells. In accordance with this aspect of the invention, match signals are collected in result collection means, which, in the preferred embodiment of the invention, takes the form of a result pipeline into which match signals pass from result taps in the cell pipeline. The result pipeline can handle as many match signals from as many as thousands of separate search queries stored in the cell pipeline, and includes collision avoidance means to ensure that multiple results are not lost because of possible overlap in their times of occurrence.

It will be appreciated from the foregoing that the present invention represents a significant advance in the field of special-purpose search processors. In particular, the invention provides a highly efficient approach to searching a serial text stream for predefined search patterns, which may have incorrect, missing or extra characters in the text stream. In addition, the processor of the invention can perform enumerated searches and search for subsets of pattern terms, within fixed or sliding windows, and including various boolean expressions of search terms. The search functions can be combined in a wide variety of ways, and nested to multiple levels.

Finally, the invention provides means for gathering the search results in such a way that multiple searches can be conducted during a single pass of the text stream. Other aspects and advantages of the invention will become apparent from the following more detailed description, taken in conjunction with the accompanying drawings.

BRIEF DESCRIPTION OF THE DRAWINGS

FIG. 1 is a block diagram of a fast search processor connected to a host system;

FIG. 2 is a block diagram of a number of cells of the search processor of the invention, connected together in a cell pipeline;

FIG. 3c is a diagram similar to FIG. 3a, but in which the text has an extra character;

FIG. 3d is a diagram similar to FIG. 3a, but in which the text has an incorrect character;

FIG. 4b is a schematic diagram of the match logic of a cell of the processor;

FIG. 4d is a schematic diagram of the counter logic of a cell;

FIG. 5a is a diagram showing the simple search function described with reference to FIG. 3;

FIG. 5b is a microcode listing corresponding to FIG. 5a;

FIG. 6a is a diagram showing the search function of alternation;

FIG. 6b is a microcode listing corresponding to FIG. 6a;

FIG. 7a is a diagram showing a more complex search involving alternation;

FIG. 7b is a microcode listing corresponding to FIG. 7a;

FIG. 8a is a diagram showing a simple search within a fixed window;

FIG. 8b is a microcode listing corresponding to FIG. 8a;

FIG. 9a is a diagram showing a more complex search with enumerated conditions within a fixed window;

FIG. 9b is a microcode listing corresponding to FIG. 9a;

FIG. 10a is a diagram showing a search for a selected subset of search terms within a fixed window;

FIG. 10b is a microcode listing corresponding to FIG. 10a;

FIG. 11b is a microcode listing corresponding to FIG. 11a;

FIG. 12a is a diagram showing a search for complex enumerated conditions within a sliding window;

FIG. 12b is a microcode listing corresponding to FIG. 12a;

FIG. 13a is a diagram showing a search involving a variable-length don't-care string;

FIG. 13b is a microcode listing corresponding to FIG. 13a;

FIG. 14a is a diagram showing a search involving a fixed-length don't-care string;

FIG. 14b is a microcode listing corresponding to FIG. 14a;

FIG. 15a is a diagram showing extended-length counter operation in a search;

FIG. 15b is a microcode listing corresponding to FIG. 15a;

DESCRIPTION OF THE PREFERRED EMBODIMENT

Figure 3A:
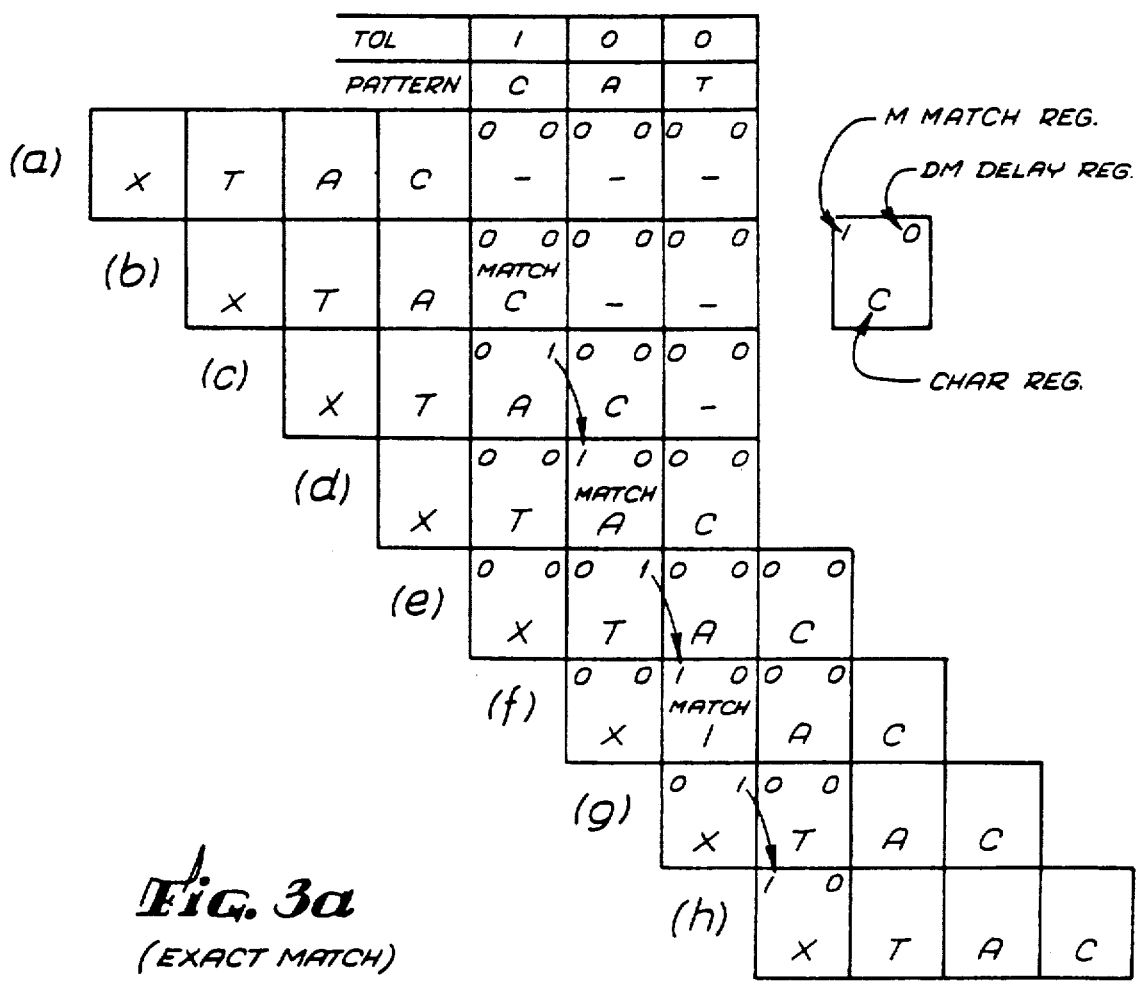
FIG. 3a is a table showing a simple search sequence using the structure of the invention, for a condition of exact matching.

As shown in the drawings for purposes of illustration, the present invention is concerned with special-purpose processors for searching streams of data, such as from data bases. Ideally, a fast search processor should be able to handle a wide variety of types of text queries, and should be able to process the queries rapidly, and preferably with the ability to handle multiple queries simultaneously. How the processor of the invention meets these and other requirements will be described in the following subsections.

By way of preliminary definition, note that a "search pattern" means any combination of characters that is to be matched or compared with a text stream. A "search term" is a portion of a search pattern that forms a logical element of a particular search query. A search term may be a string of characters, such as a word, or a complex expression involving boolean combinations of strings, and enumerations indicating a desired number of occurrences of strings. A search term may also combine other search terms in an arrangement having multiple levels of nesting.

OVERVIEW

As shown in FIG. 1, the environment in which the present invention is used includes a host computer system, indicated by reference numeral 1. The host system 1 includes a data source 2, a host processor 3, and a result memory 4, and may have any appropriate detailed architecture. Typically, the data source is a high-speed magnetic disk storage system, the host processor 3 is a conventional general-purpose processor, and the memory 4 is a conventional random access memory.

The fast search processor of the invention, indicated by reference numeral 5, receives data from the data source 2 over line 8, and transmits results over line 9 to an output buffer 10, and from there to the result memory 4, over a low-speed line 11. The search processor 5 is controlled to operate in an initialization mode and in a search mode, by signals received over line 12 from the host processor 3.

In the initialization mode, values of patterns to be searched for and values of flags which control the execution of the search are loaded into the search processor 5 over line 12. Specifically, the values of a pattern register, a mask register, a tolerance register, and a number of programmable flags are loaded into each cell during the initialization mode. These registers and flags will be defined below.

Then, in the search mode, the processor searches a data stream provided at high speed over line 8, and transmits match results at the same high speed over line 9 to the output buffer 10. A design goal of the search processor 5 is to be able to search the data stream at a speed comparable to the access rate of the data source 2. Large data bases can then be searched serially in a reasonable time, without the use of complex and costly indexing schemes.

The search processor of the preferred embodiment of the invention comprises a multiplicity of identical cells, three of which are shown at 20-22 in FIG. 2. The structure of each cell will shortly be explained in detail, but for purposes of initial explanation one need only consider that each cell includes a character line, indicated by C(8), and a match line M(3), where the numerals in parentheses indicate the number of bits in the line, the character line having eight bits and the match line three bits. The interconnected cells also have an accumulator line A, a dynamic reset line F, a load line L, and increment line I, a decrement line D, and twelve general purpose lines, designated generally Tn. Therefore, there are a total of twenty-eight lines connecting cell to cell, including eight character lines, three match lines, twelve general purpose lines, and five other lines.

Each of the lines connecting the cells has at least one register associated with it in each cell. The input signals to each cell are indicated by the subscript i, and the output signals from each cell are indicated by the subscript o. For example, the accumulator line input signal is $A_i$ and the accumulator line output signal is $A_o$. As will be discussed, some of the lines have a second register associated with them in each cell. For instance, the match line has a match register and a match delay register connected in series. The purpose of the match delay register will become apparent from the simple search example, to be described in the next descriptive section.

Successive characters from the data base being searched, received over line 8 from data source 2, are propagated from cell to cell along character line C. The match line M is the line on which match results are generated in the processor, and are propagated from cell to cell. The match line indicates a match by the presence of a non-zero value. A zero on the match line represents a non-match. Rather than carrying a simple binary match or non-match value, the match line is employed in a more general sense to carry a multi-valued match value indicative of the degree of match, i.e., the number of non-matching characters between the search pattern and the text being searched. This match value is initialized at a selected cell, usually the first one in a search pattern, to a number between one and seven. This number is one greater than the maximum number of errors that can be tolerated in the text stream. The errors may be incorrect characters, missing characters, or extra characters, all of which result in the decrementing of the value on the match line by a count of one. When the match line value has been decremented to zero, there is said to be no match between the search pattern and the portion of the text stream being analyzed.

Operation of the cells is in accordance with a relatively straightforward logical sequence, which is identical from cell to cell. At each clock cycle, and in each cell, the character currently in the cell is compared to a pattern character previously stored in the cell during the initialization phase. By way of example, the letters C-A-T are assumed to be the pattern characters stored in cells 20-22, respectively. If the characters CAT were to appear in the input data stream, the incoming C would match with the pattern C in the first cell 20. As the character C passes to the second cell 21, it is followed, on the match line M, by a match value indicative of a match in the first cell. More precisely, the indication of a match propagates to the second cell concurrent with the next data character following the matching one. Two clock cycles after the match of C characters, the incoming A character is introduced to the second cell 21 and a match is found with the pattern character A in that cell. The architecture of the individual cells is such that the match value emerging on match line M from the first cell 20 will be passed through the second cell 21 if a match is found in that cell also. Similarly, when the incoming T character is found to match the pattern stored in the third cell 22, the match value on the match line M emerges from the third cell. In this example, the third cell is the last one in the pattern and, as will be explained, contains a programming flag that has the effect of transferring the match value from the match line M to one of the other lines through the processor. Typically, as will become clear from examples to be discussed, it is the accumulator or A line that is used to collect and combine match results from the match line. The propagation of match values from cell to cell will be explained in more detail in the section below entitled "Simple Search Function."

EXPLANATION OF SIGNAL NAMES IN THE FIGURES

There are six types of signals shown in FIGS. 4a-4f, each with its own naming convention:

1. Control signals: These include the signals trans, dump, init1, init2, init2x, init3 and init4. These signals are shared by all cells in the processor, but are used only during initialization and in a diagnostic mode that does not form part of the invention. During the execution of a search, these control signals are set to zero.

2. Registers: Registers are storage devices that take on the value applied to their inputs at the time of a rising edge of a clock pulse. All of the registers are controlled by the same clock signals, so they all take on a new value at the same time during a clock cycle. The registers are named with a one-letter or two-letter (upper-case) designation. They include the datapath registers, M(3), A, L, I, D, F, C(8) and T(12), the counter K(8), and the delay registers DL, DA, DD, DM, IP and DP.

3. Input signals: These are the datapath inputs to a cell, supplied from the corresponding outputs from the previous cell in the pipeline of cells making up the processor. The signal name consists of the corresponding register name followed by a lower-case i.

4. Output signals: Every data input signal has a corresponding output signal, designated with a trailing lower-case o, and connected to the corresponding input of the next cell in the pipeline.

5. Control Flags: These are registers that take on a new value only during the initialization phase. They consititute a microcoded program that determines the subsequent behaviour of each cell druing execution of a search. They are named with an upper-case designation of two or more letters, such as PATT(8), MASK(8), LEN(8), MS(2), OS(3), and so forth. A complete listing of the control flags is included in the descriptive section below entitled "Initialization."

6. Internal Signals: All other signal names refer to internal signals. They always contain a lower-case letter and are of no special significance except for purposes of defining and explaining signal paths within the cells. Some internal signals are used as inputs to logical elements within the cell, i.e. the names are used to define signal paths without tracing a connecting lines in the drawings.

THE COMPARISON LOGIC

Figure 4A:
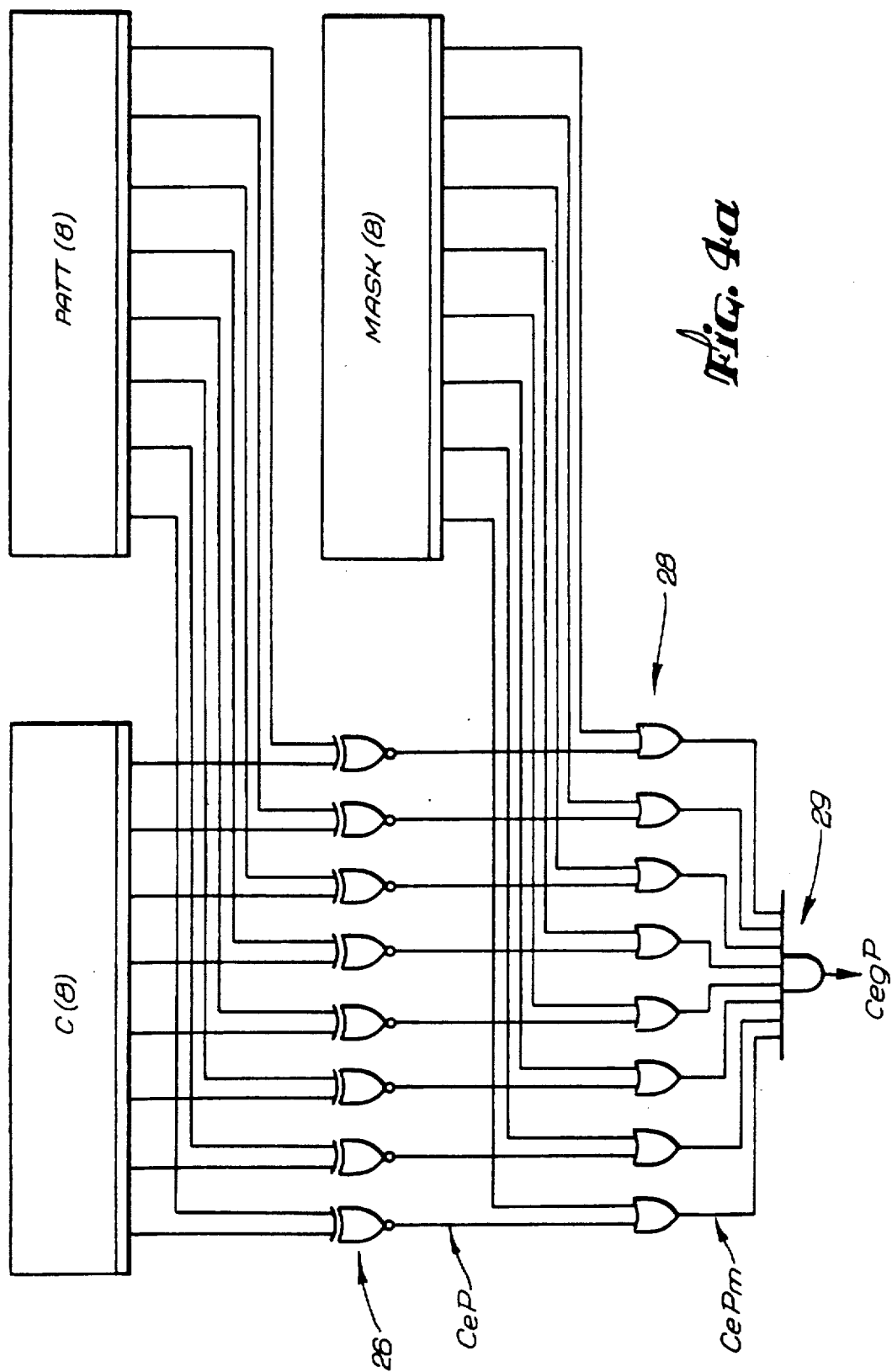
FIG. 4a is a schematic diagram of the comparison logic of a cell.

The comparison logic is shown in FIG. 4a, and includes a character register C(8), a pattern register PATT(8) and a mask register MASK(8). The character register is connected to the input and output character lines and stores the current text character passing through the cell. The pattern register is used to store a character of a search pattern prior to initiating a search with the processor. The mask register is another eight-bit register that is initialized prior to a search. It is used to selectively mask out bits from the comparison process between the character register and the pattern register. For example, the mask register can be set to mask out a bit position that distinguishes upper-case letters from lower-case letters, so that the comparison logic will find a match regardless of the case of the characters.

The comparison logic also includes a set of eight exclusive OR (XOR) gates 26 having inverted outputs and connected to receive inputs from the character register and the pattern register. Each of the XOR gates 26 will produce a "1" output if both inputs match, and a "0" output if the inputs do not match. The eight outputs from the XOR gates 26 are ORed together with the eight corresponding bits of the mask register, in a set of eight OR gates 28. A "1" in a mask register bit position will, therefore, always produce a "1" output from the corresponding OR gate 28. The outputs of the OR gates 28 are ANDed together in a single AND gate 29, the output of which is a composite match signal designated CeqP, for character equals pattern.

THE MATCH LOGIC

The match logic is shown in FIG. 4b and is critical to operation of the search processor of the invention. Most of the hardware elements of the logic will be described in this section, and the functions will be introduced as the various search operations are described later.

The match logic includes a three-bit match register M(3), which receives input data on line Mi, and a match delay register DM(3), which receives data over various paths from the match register and supplies output data to the output match line Mo. There is also a tolerance register TOL(3) used to load match values onto the match line, and there are a number of multiplexers (MUXs) for routing data through the match logic. Each of the two-input multiplexers that appear in the match logic and in other areas of the cell schematic diagrams, have two data inputs, designated the "0" input and the "1" input, and one control input for selecting which of the data inputs is to be routed to a single output from the multiplexer. The convention employed in each multiplexer is that, if the control input is a logical "1", the "1" data input is selected, and if the control input is a logical "0", the "0" data input is selected.

Other multiplexers with a larger number of inputs also appear in the various logic diagrams and operate in a similar manner to the two-input devices. For example, a four-input MUX has a two-bit control line with four possible digital values, to select one of the four input values.

Output from the match register M is connected to the "0" input of a MUX 30, which is used to select either the match value derived from the match register or a new match value derived from the tolerance register TOL(3). The tolerance register is connected to the "1" input of the MUX 30 through an AND gate 32, the other input of which is supplied from the output of a four-input MUX 34. MUX 34 selects a source for determining whether the match line will receive a new match value, or zero. The possible sources are a logical "1" input, which, if selected, always loads the new tolerance, the condition of the A register, to be described, the condition that M, i.e. the value stored in match register M, is greater than zero (Mgt0), or the condition of one of the general purpose lines (Tn). A programmable M source flag, MS(2), controls the selection of which condition will determine whether the tolerance register or zero is loaded onto the match line.

MUX 30 is controlled by a load-tolerance signal, LT, applied to the control input of the MUX through an AND gate 36, the other input of which is a signal that is normally a "1". Therefore, when the LT signal is a logical "0", as will most often be the case, the value in the M register will be transmitted through the MUX 30 to its output line, on which the value is designated Mw. The Mw line is split into two paths, one of which leads directly to the "1" input of another MUX 38, and the other of which passes through a decrementing circuit 40, after which the signal is designated Mwm1, (for Mw minus one). The decrementing circuit produces a value which is one less than the input value, unless the input value is zero, in which case a zero is produced. This signal is passed through an AND gate 42, the purpose of which will be explained, and from there proceeds as signal My to the "0" input of the MUX 38.

The MUX 38 performs one of the most important functions of the processor, the selective decrementing of the match value on the M line. The control line for this MUX is derived from a match signal obtained by comparing the incoming text character with a stored pattern, as described above with reference to FIG. 4a, in the section entitled "Comparison Logic." The comparison logic of FIG. 4a generates a match signal designated CeqP (for character-equals-pattern), and this signal is applied to control the MUX 38, through some additional logic including another MUX 44, an exclusive OR (XOR) gate 46 and an OR gate 48. The MUX 44 selects between the CeqP signal and an alternative signal derived from any of the general purpose lines Tn, as controlled by a signal designated CT. The output of this MUX 44 is input to the XOR gate 46, the other input of which is a control signal designated IC, for invert-comparison, which permits the sense of the match signal to be inverted. Finally, the match signal is passed through the OR gate 48 to control the MUX 38. Basically, the Mw input is selected if there is a match, i.e. the match value is not changed, and the My value is selected if there is no match, i.e. the decremented value is selected. The output of the MUX 38 is designated Mz.

The Mz signal is input to the "1" input of another MUX 50, the purpose of which concerns the detection of extra characters, and emerges as signal Ms, which is input to the delay register DM. The output of the DM register is input to the "0" input of another MUX 52, used in the detection of missing characters, and emerges as signal Mt. The latter signal is introduced as the "0" input of yet another MUX 54, used to control selective bypassing of the delay register in some instances. The output of this last MUX 54 is the Mo output signal on the match line.

In the simple case where no new match value has been loaded into this cell, the match logic operates to pass a new input value Mi to the match register every clock cycle, and to pass the value previously stored in the match register M to the match delay register DM, the contents of which are output as Mo. The key function of the match logic is to decrement the match value passed to the delay register if no match is detected between the character arriving at the cell and the pattern stored in the cell. This preliminary discussion of the match logic should permit an understanding of a simple search, to be described with reference to FIG. 3.

SIMPLE SEARCH FUNCTION

The mechanics of the search can best be explained in terms of specific examples, shown in FIGS. 3a–3e. In these figures, three consecutive cells, indicated as $c_1$, $c_2$ and $c_3$, are initialized (during the initialization phase) with a pattern to be searched for in the incoming data stream. In the example, the search pattern is the word CAT. The pattern registers of the cells contain the letters C, A and T, respectively. The tolerance register for the first cell (the $c_1$ cell) is initialized with the desired match tolerance. In the example, this is assumed to be a "1", meaning that a perfect match is desired. The tolerance registers of the other cells are not used.

After initialization, the cells have the following contents:

|           | $c_1$ | $c_2$ | $c_3$ |
|-----------|-------|-------|-------|
| Pattern   | C     | A     | T     |
| Mask      | U     | U     | U     |
| Tolerance | 1     | 0     | 0     |
| LT        | 1     | 0     | 0     |

(All other flags are set to 0.)

The mask flag has a certain bit set to force a match regardless of whether upper or lower case characters appear in the date. This is indicated by the letter U.

If a letter C is input to the first cell $c_1$, a match will be found and a match value of "1" will be passed to the match delay register DM. The purpose of the delay register is to synchronize the propagation rate of the match value on the match line with that of the data on the character line. For a search pattern of n characters, it will take 2n clock cycles for an n-character sequence within the data stream to pass completely across the search pattern. Therefore, to provide a match result out of the processor when the last data stream character is emerging requires that the match line values progress along the line at half the character clocking rate. The delay register at each cell position takes care of this timing difference. Another way to appreciate the need for the delay is to consider the number of clock cycles that must occur between the matching of two adjacent characters. After the matching of the C's in cell $c_1$, shown in line (b) of FIG. 3a, two clock cycles must occur before the A's are aligned for match detection cell $c_2$, as shown in line (d).

In line (a) of FIG. 3a, the letters CATX are shown as approaching the search pattern. The two numerals in each cell represent the match values at the M register and the match delay register, respectively. These are initially all zero. In line (b), the letter C has advanced to the first cell $c_1$ and a "1" has been introduced onto the match line from the tolerance register, as described above with reference to the match logic of FIG. 4b. In line (c), the letter C has advanced to the second cell $c_2$ and the letter A is in the first cell $c_1$. Since there was a match in the previous line in the first cell $c_1$, a "1" match value will advance to the delay register in this cell. On the next clock cycle, as shown on line (d), the "1" from the delay register of the first cell is shifted into the M register of the second cell $c_2$, where the data character A is aligned with the A of the search pattern. On the next cycle, on line (e), the "1" is advanced to the delay register of the second cell $c_2$, since there was previously a match in that cell. In the next cycle, on line (f), the "1" is propagated to the M register of the third cell $c_3$, where the T characters now match. In line (g), the "1" moves to the delay register of the third cell $c_3$, because of the previous match in that cell. The final step is shown in line (h), in which the match value of "1" emerges from the search pattern with the letter X, which immediately follows the pattern located in the data stream. It will be seen that the match value will propagate across the search pattern of cells only if a match has been detected in each successive cell of the pattern.

If a match value higher than "1" were introduced in the first character of the search pattern, one or more errors could then be tolerated in the data stream. For example, if a match value of "3" were used, CAT would produce a result of "3", COT a result of "2", and COP a result of "1". Each error decrements the match value by "1". In a three-letter pattern, all three letters would have to be in error to reduce the match value to zero.

HANDLING MISSING AND EXTRA CHARACTERS

The match logic as described to this point is capable of tolerating incorrect characters in the text stream, within the limit set by the tolerance register, but a missing or extra character would have the effect of non-recognition of following characters. The match logic of the invention, however, includes means for detecting missing and extra characters in the text stream.

The basic concept of handling missing/extra character logic is that each cell continually assumes that the current character being matched may be either correct, missing, extra, or incorrect, and it chooses the "best" interpretation at each clock cycle, i.e. the interpretation yielding the fewest errors and the highest match value.

Figure 3B:
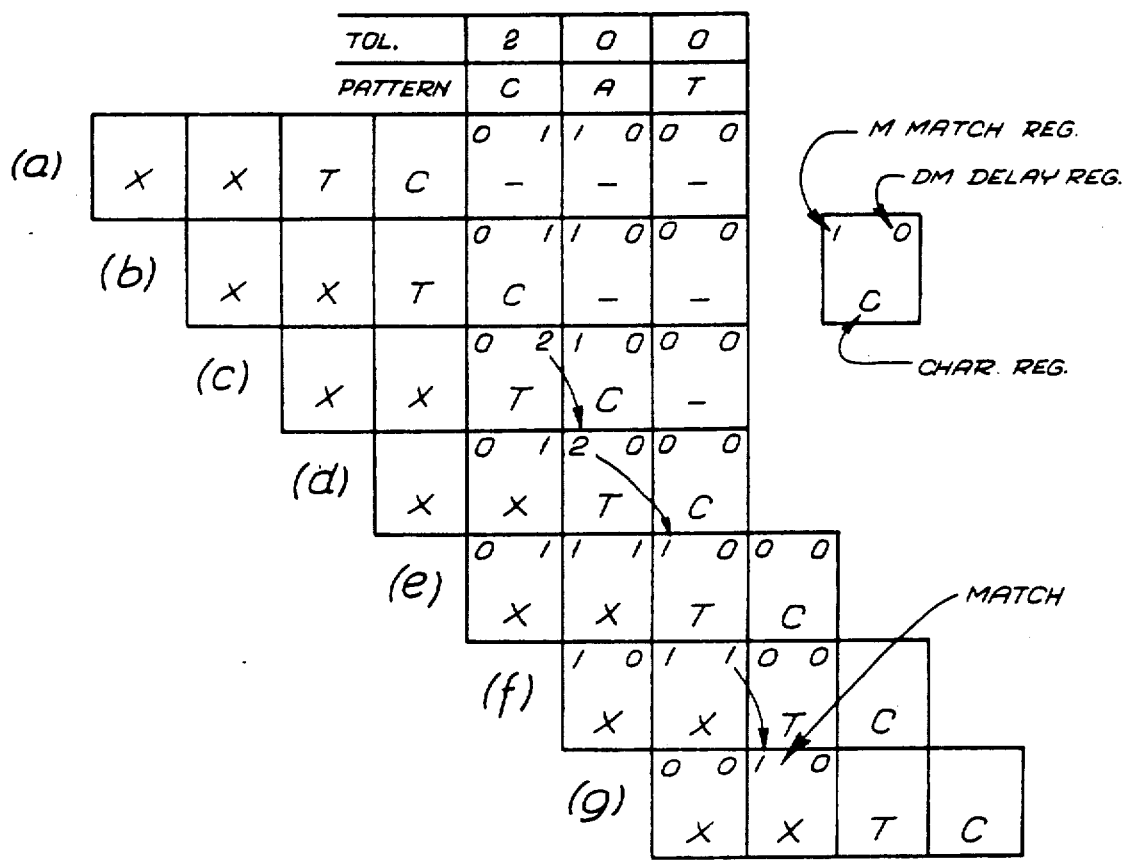
FIG. 3b is a diagram similar to FIG. 3a, but in which the text has a missing character.
Figure 3C:
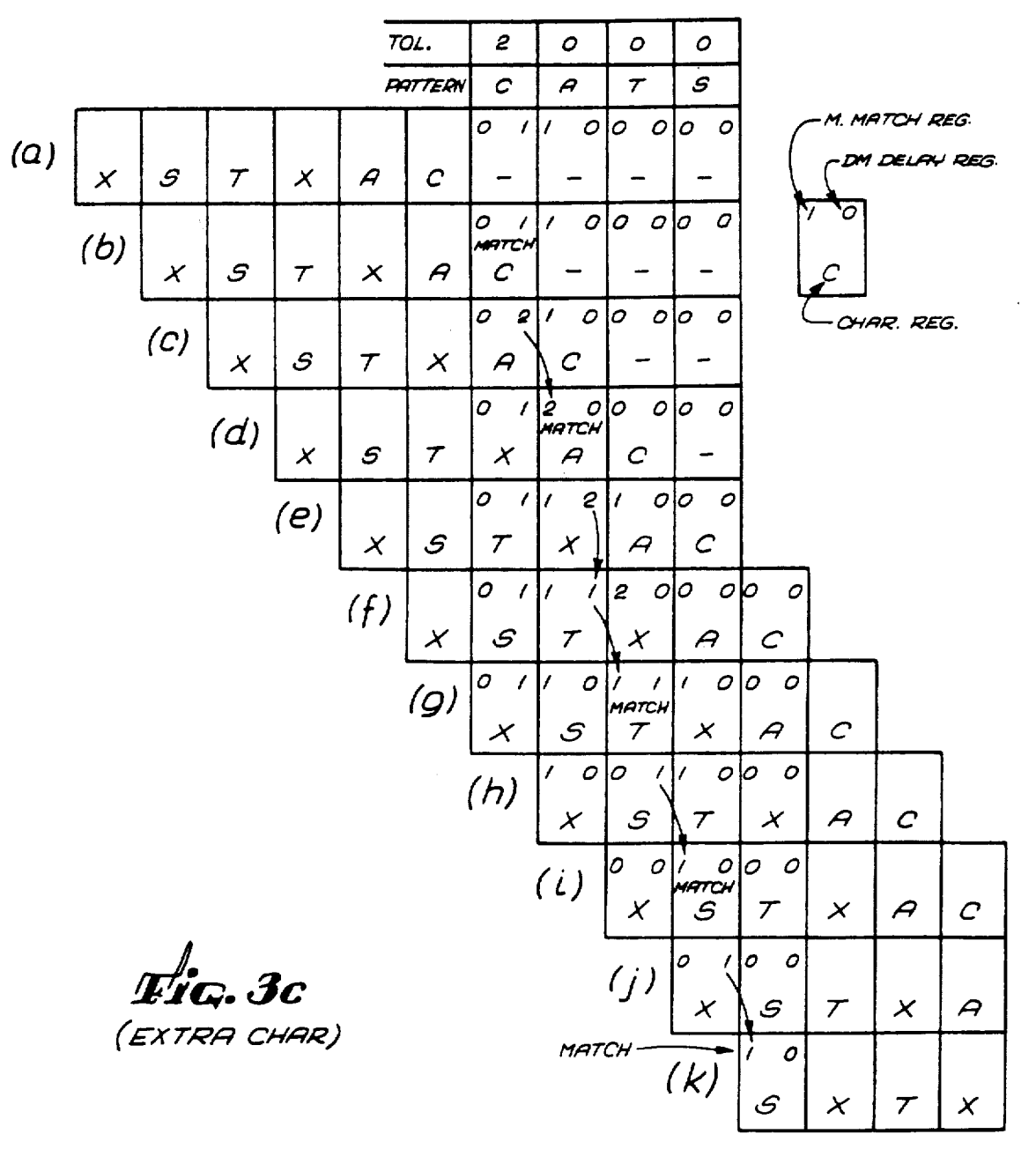
Figure 3D:
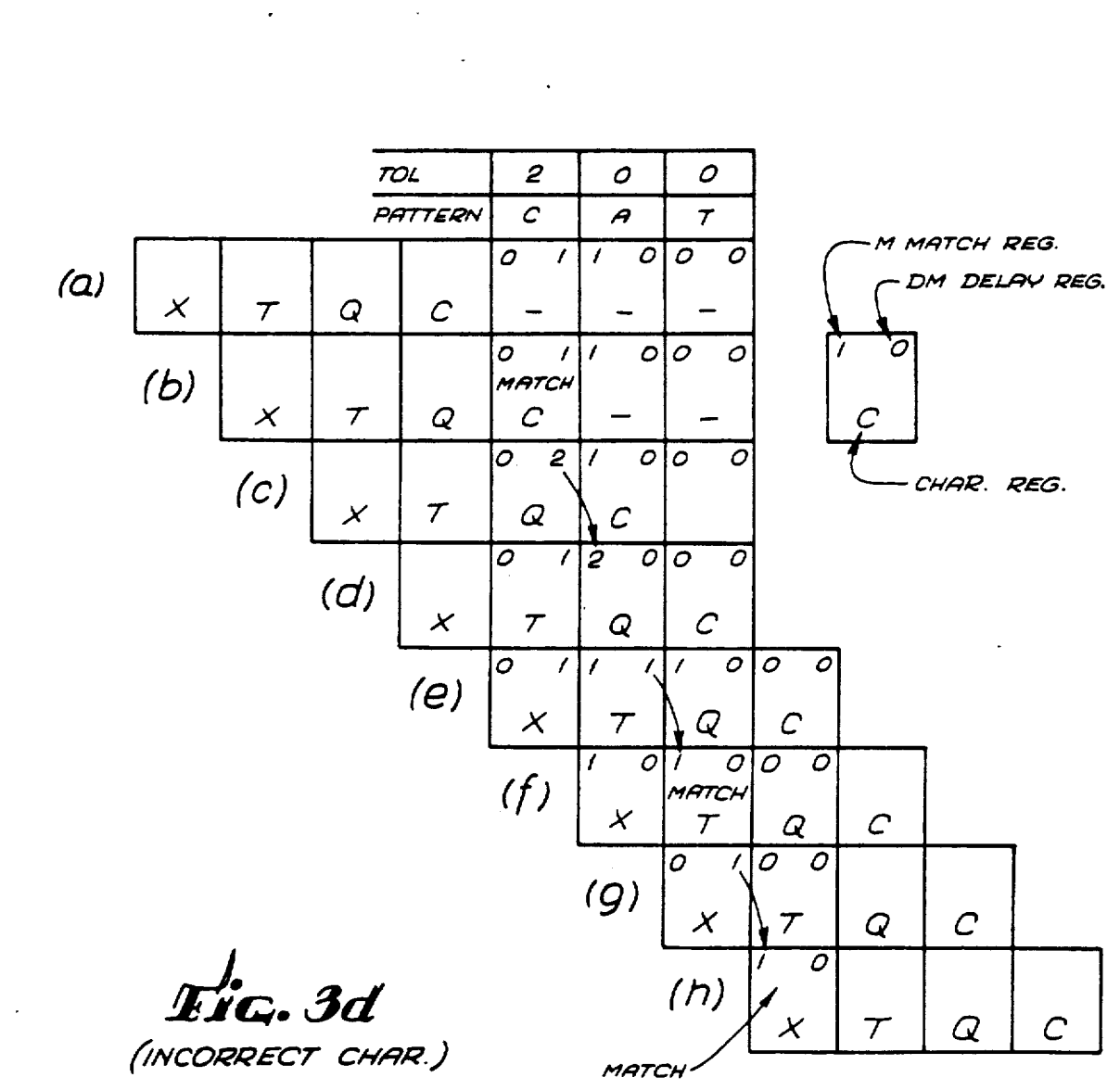
Figure 3E:
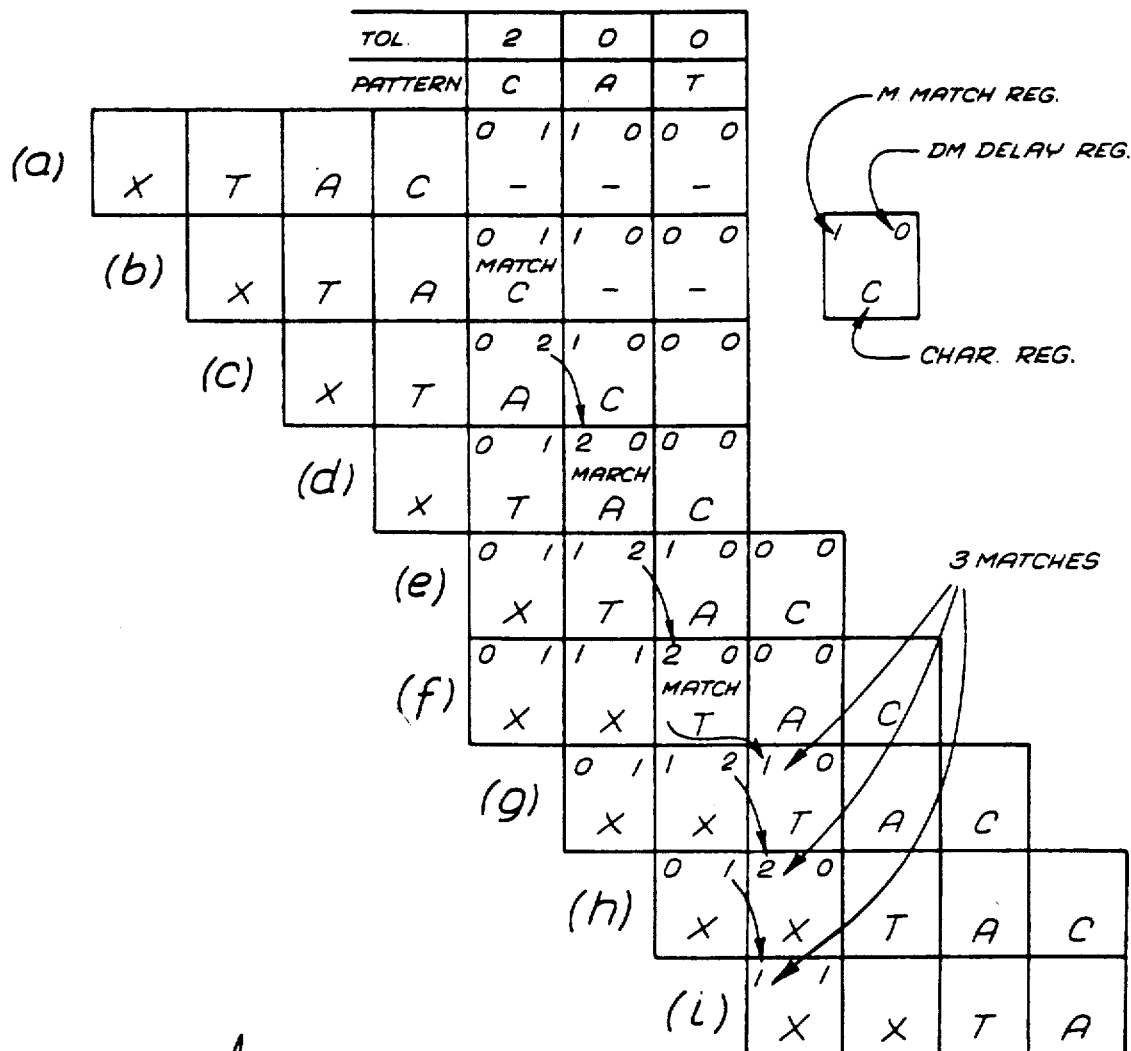
FIG. 3e is a diagram similar to FIG. 3a, but in which the text has no errors and an error tolerance of 2 is specified.

To handle a missing character, a cell needs to bypass the delay match register DM, so that the match value is propagated to the next cell simultaneously with the next character in the text stream. However, the match value is decremented because a missing character constitutes a match error. FIG. 3b illustrates this. The pattern is CAT, with a tolerance for one error, i.e. a tolerance value of two. The incoming text is CTX, where X is the character following the desired pattern, and the letter A is missing. The C character matches in step (b), as in FIG. 3a, leaving behind a match value of two in delay register DM for the next character to take into the next cell in step (c). However, T is the next character in this example, rather than A. T does not match, and M would normally be decremented and saved in DM, while the T would be clocked into the T cell with a zero on the M line, thereby losing the thread of the match. With the missing/extra logic, however, the A cell assumes that the A may be missing, so it clocks the T text character into the T cell, along with the match value M-1, i.e. $2-1=1$, bypassing the DM register. Note that DM still becomes 1 as before. However, this thread dies two steps later, at step (g), while the missing character thread survives, since T in the text matches the T cell in step (e).

In order to handle an extra character in the text, the processor must hold the DM value for one extra cycle, to give the following pattern character time to "catch up" to the match value. However, the match value held in DM is decremented because the extra character consititutes a match error. FIG. 3c gives an example of extra-character processing, where the pattern is CATS with up to one error, and the incoming text is CAXTSX. Normally, this text would not match the pattern stored in the cells, since the extra X character would throw off the thread of the search. However, with the missing/extra logic the DM value is held onto for an extra cycle in the A cell, allowing T to catch up to the thread. Thus, as before, C matches cell C at step (b), leaving a 2 in DM for the A to carry into the A cell at step (d). A also matches, leaving a 2 behind in DM for the next character to carry into the T cell. The next character is an X rather than a T, at step (f). The X normally would carry the 2 value from the DM value in the A cell, leaving behind a 0 value. However, with the missing/extra logic enabled, the 2 value in DM is retained for one cycle and decremented to a 1, in step (f), in anticipation that the thread may be picked up again by the next character after the X. Indeed, the next character is the desired T, which then carries the 1 value from DM into the T cell on cycle (g), thus resuming the thread. The T matches, leaving a 1 in DM at step (h). The S then carries this into the S cell and matches at step (i). This match value is brought out of the pattern by the next character, at step (k), yielding a match result.

It would seem at first impression that it is difficult to decide at each cell whether the current character being matched is missing, extra, incorrect or correct. The solution is to provide logic that provides for all of these possibilities simultaneously, and then to select the result that yields the highest match value. Thus, the next value of DM at a given cycle could be derived either from M if the character matches, from M-1 if the character does not match, or from DM-1 if the last character turns out to be an extra character. DM is then set to the larger of DM-1 and M-k, where k is 1 if there is no match, or 0 otherwise. Similarly, the output match value from a cell, Mo could be either DM if the pattern is matching without any missing or extra characters, or M-1 if the character for the current cell is missing. Again, Mo is set to the larger of DM and M-1. This is accomplished by the comparator 62 and the MUX 52 in the match logic of FIG. 4b.

In general, there will be 2e+1 successive matches generated for an exactly matching string of text, where e is the number of errors tolerated, which is one less than the tolerance register value initially placed on the match line M. For example, in FIG. 3e, the pattern is CAT with up to one error. When a CATX appears in the text, three matches are generated. A first match is generated following the A, since CA is CAT with one missing character. Of course, a match is generated following the exact match CAT. Then, a third match is generated following the X, since CATX is CAT with one extra character.

For completeness, FIG. 3d illustrates the pattern CAT with up to one error matching on the text CQT, i.e. the incorrect character case. As can be seen in the figure, the missing and extra character threads disappear by the end of the string, and a single match is generated following the T.

The missing/extra (ME) control flag enables the missing/extra logic in each cell. When the flag is zero or off, the cell will not tolerate missing or extra characters and behaves as though the logic were not present.

The match logic that performs the missing-character function includes a feed-forward path of the signal My (the decremented match value) to the "0" input of a MUX 60. The "1" input of the MUX 60 is derived from the Mw signal (the non-decremented M value), and the control signal for the MUX is a flag designated HYP, which is used for a special hyphenation function to be described. Normally, the flag HYP is zero and the "0" input is selected for transmission through the MUX, the output of which is designated Mr and is connected as the "1" input of MUX 52. The signal Mr is the feed-forward signal that bypasses the delay register and has been decremented by the decrementing circuit 40. The control signal applied to the MUX 52 determines which input to choose, based on the values of Mr and the value in the delay register DM. A comparator 62 receives as inputs the values of Mr and DM and produces as output a binary signal MrgtDM indicating whether Mr is greater than DM. This signal is ANDed in an AND gate 64 with a flag designated ME, which is set to a "1" to enable the missing-extra character logic. If Mr is greater than the DM value, the "1" input of MUX 52 is selected, so that the bypass path supplies the match value to the output line Mo.

The elements of the match logic that perform the processing of extra characters include another MUX 66, having a "1" input supplied directly from the output of the delay register, and a "0" output supplied from the same source but through a decrementing circuit 68. The output of this MUX, designated Mu, is connected to the "0" input of MUX 50. The control circuit for this MUX includes a comparator 70, an OR gate 72 and another MUX 74. The comparator 70 generates a logical "1" output only if Mz, the normal input to the delay register, is greater than Mu, the match value fed back from the output of the delay register. This signal is ORed with the inverse of the ME flag. As explained, above, the ME flag is set to a "1" to enable the missing/extra character logic. Therefore, if ME is zero the output of the OR gate 72 is a "1" and this value is passed through MUX 74 to select the "1" input of MUX 50, so that the extra-character feedback path is ignored. If ME is a "1", Mz must be greater than Mu for the same input of MUX 50 to be selected. If Mu is greater than or equal to Mz, the feedback path carrying the Mu value is selected for input.

OTHER PROGRAMMABLE FLAGS

The MBT flag, which stands for "must-be-there," is used to force the match value in a cell to zero, rather than merely decrementing the match value, if the pattern character is not present in the text stream at the expected position.

The PASS flag is used to allow the M line to appear transparent, using MUX 54. Output signal Mo is set to the value in M rather than being derived from the delay register DM.

The CT flag (character match on T) allows the comparison logic to be bypassed at the MUX 44. When CT is on ("1"), the match logic looks to Tn to decide whether there is a match. Thus, it is possible to match complex patterns, save the resulting match value on a T line, then retrieve it later for repeated use in other patterns, at a cost of only one cell per use. This is particularly useful for matching non-alphabetic characters economically, since in general use one would want to find bounded at their beginnings and endings with non-alphabetic characters. Using the CT flag greatly reduces the number of cells required for this type of search.

The HYP flag is used to enable the special hyphen handling function of the processor. Typically, words in text may be interrupted by a hyphen character, followed by a number of spaces and new-line or new-page characters. Hyphenated words are difficult to detect without special processing, since one would have to compose a query that included all of the possible hyphenation alternatives. A HYP function cell is inserted at every point in a word where a hyphen may occur. Normally, a HYP cell will simply pass the match value in M to Mo, thus acting as a transparent cell. This is accomplished by the MUX 60. The pattern register is set to a hyphen character, typically "-" but possibly some other character. Tn is set up previously to match on "white space" characters that may follow a hyphen, such as "space", "tab", "new-line", or "new-page". When a hyphen character matches, the cell goes into a mode in which DM is preserved at its current value so long as the value from Tn is 1, i.e. so long as there is only white space following the hyphen. Whenever a nonwhite-space character arrives, DM is decremented. This is accomplished by the MUX 66. The effect is to bridge across a hyphen interrupting a word, keeping the missing/extra data intact.

THE ACCUMULATOR LOGIC

Figure 4C:
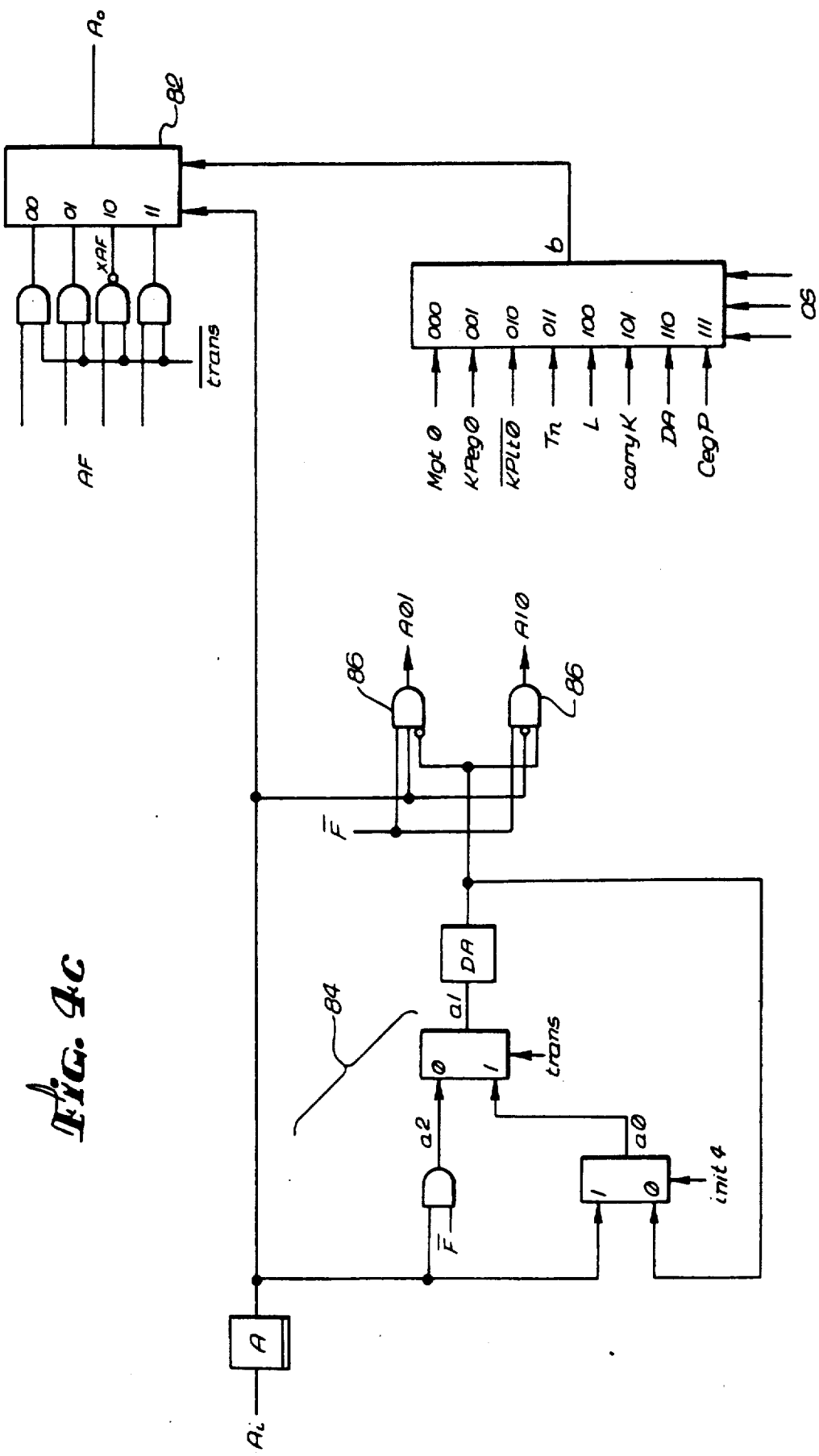
FIG. 4c is a schematic diagram of the accumulator logic of a cell.

The accumulator or A line is used to combine search results in a variety of ways. As shown in FIG. 4c, the accumulator logic includes a one-bit accumulator register A, an eight-input MUX 80 for selecting an operand for combining with the A register value, and a four-input MUX 82 for defining the logical function to be performed on the A register contents and the selected operand. There is also a delay accumulator register DA that contains the prior value stored in the A register.

The MUX 80 is controlled by a three-bit flag designated OS(3) for operand selection. Basically, the accumulator logic can perform any selected logical function on any selected operand and the incoming value on the A line. The operands available for selection include: a signal indicating that the match register is greater than zero (Mgt0), two signals derived from a counter K within the cell, a signal indicative of the state of any selected storage line Tn, a signal indicative of a carry out of the counter K, a signal derived from the delay accumulator DA, and the match signal CeqP derived from the comparison logic.

The selected operand and the A register signal are applied as the two-bit control signal to the MUX 82. The data inputs to the MUX are four binary signals designated AF for accumulator function. The AF signals define the logical function that is to be performed on the two control signal inputs. In effect the AF signals constitute a truth table of the results of performing the desired function on the two control signal inputs. A simple example will make this clear.

Suppose it is desired to logically AND the contents of the A register with a signal derived from the condition that the match line is greater than zero. The OS flag is set to select the Mgt0 input to the MUX 80, to select the desired operand. The truth table for the desired AND function is such that the function A AND the operand will be "0" in all cases except when A and the operand are both "1". Hence the values applied to the AF inputs are 0001. The outputs from the MUX 82, i.e. the Ao signals, will be "0" when the inputs (A and operand) are "00", "01" and "10", but will be "1" when the inputs are "11". Other logical combinations of the A register and a selected operand can be provided by appropriate selection of the A function signals AF. In this manner, the A line can be used to combine results from the M line and from other lines, as well as from the current match signal, the signals indicating the state of the counter, a carry signal from the counter, and the delayed A signal DA.

The delay accumulator register DA is loaded through logic indicated only generally by reference numeral 84, the purpose of which is concerned with initialization procedures. Two AND gates 86 are connected to receive inputs from both the A register and the DA register, and to produce two output signals, one indicating when the A register makes a transition from "0" to "1" and the other indicating when the A register makes a transition from "1" to "0". These signals are employed in the increment and decrement logic to be described in relation to subset searches.

THE COUNTER LOGIC

As shown in FIG. 4d, the counter logic is employed to control operation on a counter K(8) in each of the cells. Basically, the counter is loaded with a value stored in a length register LEN when a binary signal, selected by a counter load source (CLS) flag, has a value of "1". Further, the counter is incremented or decremented based on the condition of a decrement source, indicated by DEC. The current value stored in the counter is available for conditioning various decisions made in the cell.

More specifically, loading of the counter is controlled by an eight-input MUX 90 having a three-bit control signal CLS to select the load source from the eight inputs. The possible conditions triggering loading of the counter are: a match register greater than zero (Mgt0), an L line of "1", an A line of "1", a "1" on a selected general purpose line Tn, and three composite load signals derived from combinations of other signals. A logical "0" may also be selected for input to the MUX 90, to preclude loading of the counter under any conditions.

The selection of a condition to increment or decrement the counter is performed in a similar manner, using MUX 96 under the control of a three-bit signal designated DEC. The possible conditions used to control the counter K are: a "1" in the A line, a match line greater than zero, a "1" on any selected general purpose line Tn, a "1" on the L line, or a "1" on the D line. A fixed "1" may be selected for input, or a fixed "0", to ensure or preclude changing of the counter.

The eight counter bits are logically combined to provide signals indicative of a variety of conditions, such as K equal to zero, equal to one or minus one, less than zero, less than or equal to zero, and so forth. These conditions are, in turn, combined with other signals to produce the signals KPeq0 and KPlt0, which stand for "K prime equal to zero" and "K prime less than zero," where K prime is the state that the counter will take on the next clock cycle.

THE INCREMENT AND DECREMENT LOGIC

Figure 4E:
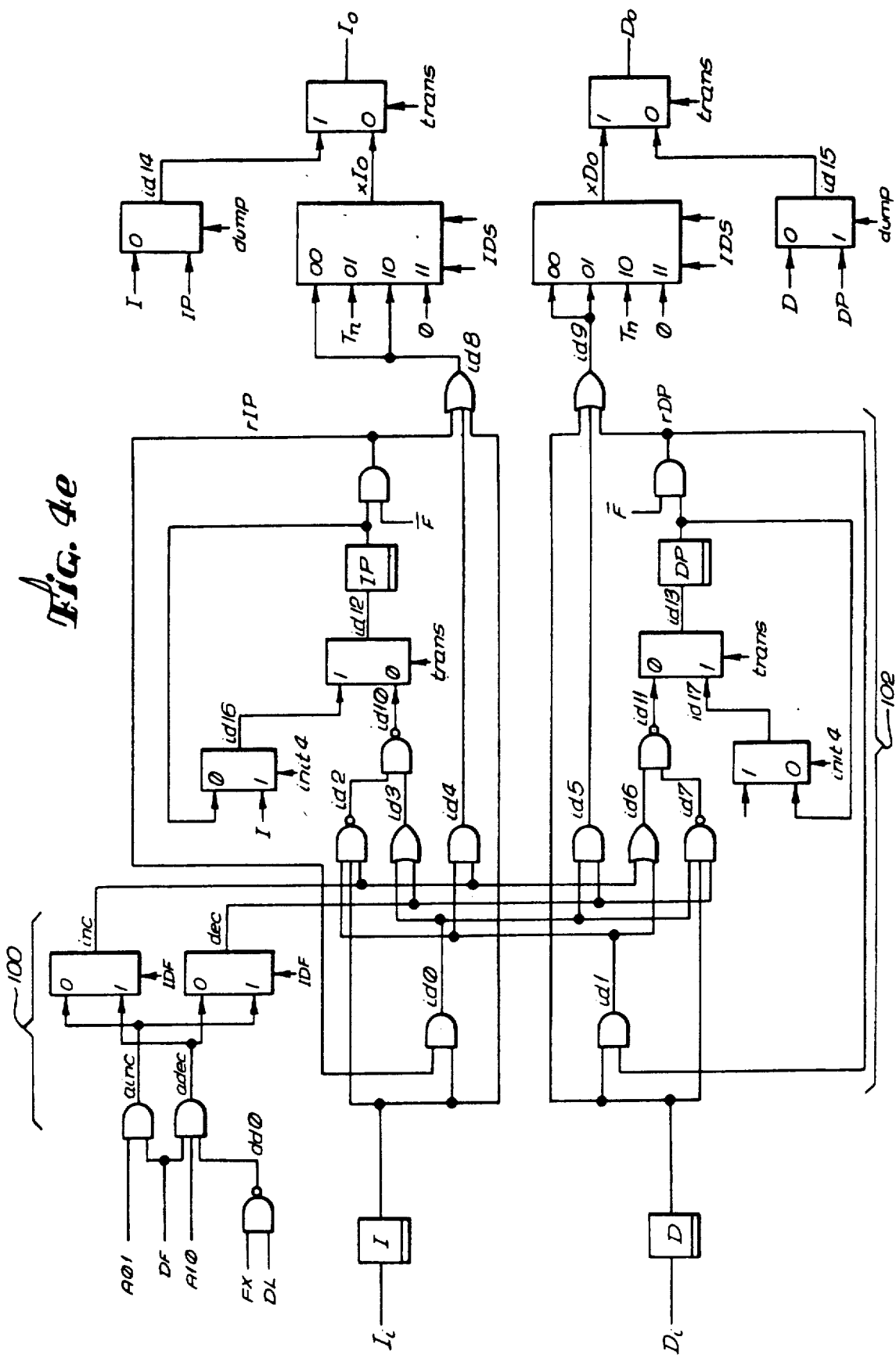
FIG. 4e is a schematic diagram of the increment and decrement logic of a cell.

This logic, shown in FIG. 4e, is used to control the conditions on the I line and the D line of the processor. Input signals Ii and Di are received on the I and D lines and are connected to the increment and decrement registers I and D, respectively. The logic indicated generally by reference numeral 100 receives signals A01 and A10 from the accumulator logic, respectively indicating positive and negative transitions in the value on the A line, and generates corresponding increment and decrement signals for further processing in the increment and decrement logic. The logic indicated generally by reference numeral 102 is collision avoidance logic, the need for which will become apparent in the description of searches for subsets of search terms.

Basically, the principal function of the increment and decrement logic is to carry signals indicative of transitions in the condition of the A register. As will be seen, this function is useful in the performance of searches in which subsets of search terms are located. The collision avoidance logic 102 is needed to address the problem that can arise if a transition in the A register of a cell cannot be recorded on the I or D line because the line is already carrying a "1" signal from its input. In such a case, the logic 102 saves the transition information in one of the registers IP and DP, for "increment pending" and "decrement pending," from which it is later transmitted on the I or D line when there is no collision with incoming data on the Ii or Di inputs.

GENERAL PURPOSE LINES

Figure 4F:
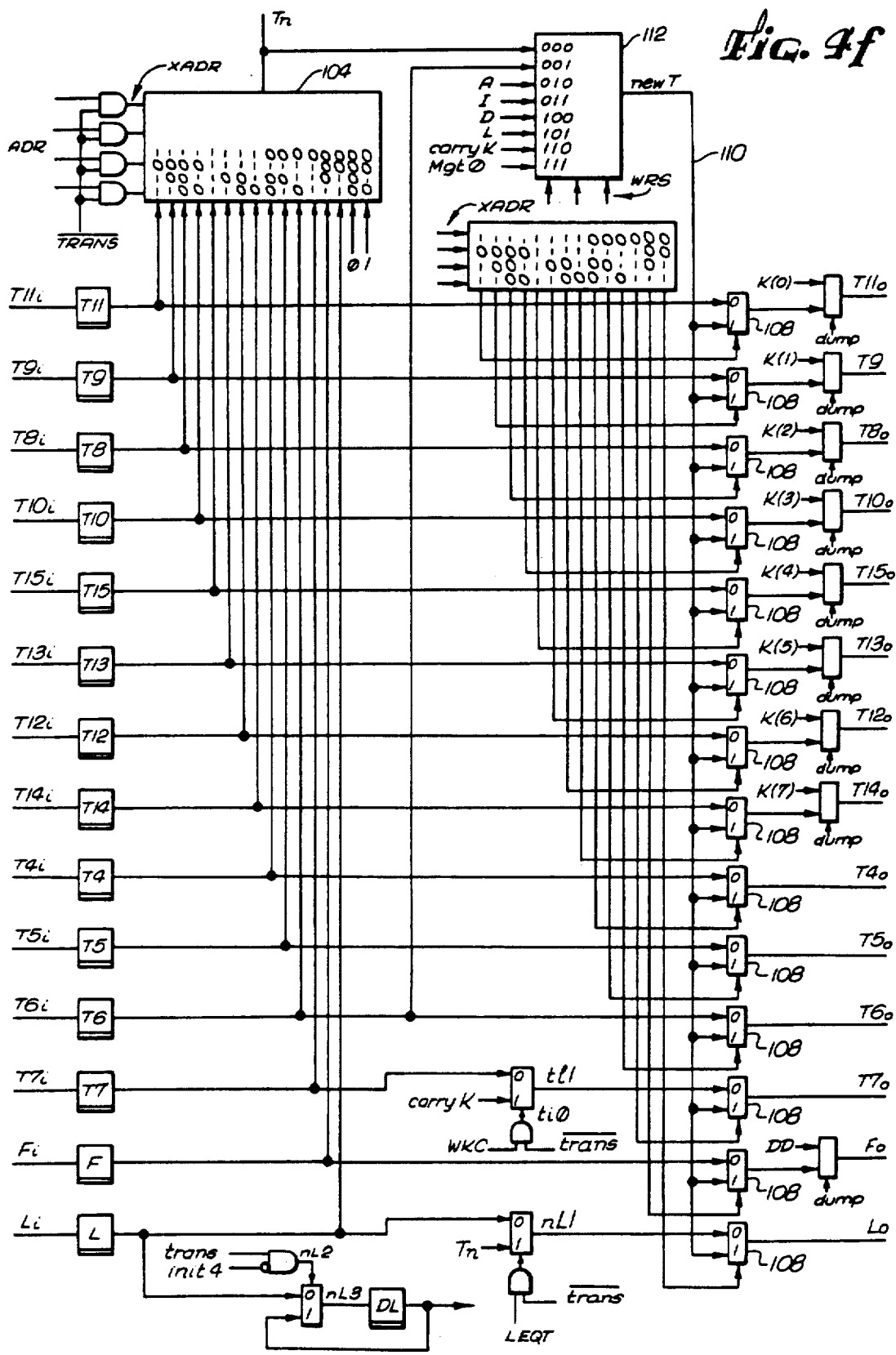
FIG. 4f is a schematic diagram of the logic for addressing additional lines of the cell structure.
Figures 5A, 5B, 6A, 6B:
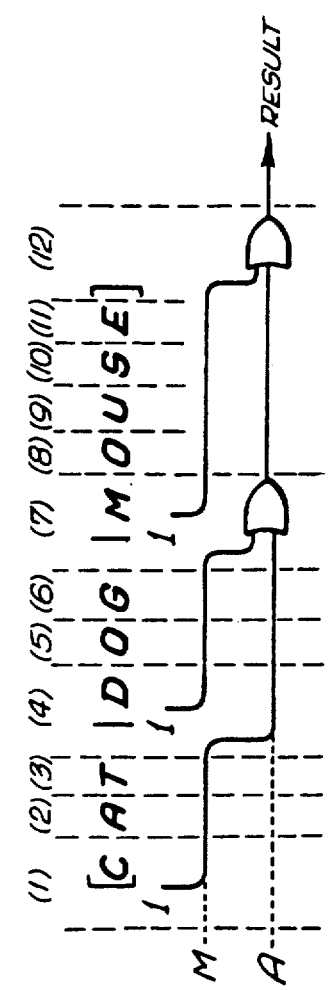

As shown in FIG. 4f, there are twelve general purpose lines, designated Tn, connecting through the cells of the search processor. They are used for storage of intermediate match results in twelve corresponding one-bit registers, T4–T15. Each cell contains logic to read from a selected one of the general purpose registers and logic to write onto a selected one of the general purpose lines. The reading logic includes a sixteen-input MUX 104 having twelve input lines supplied from the outputs of the twelve general purpose registers, and four other special and useful inputs. The four other inputs are from the F register, from the L register and from a logical "1" and a logical "0". Four address lines ADR control the MUX 104 and effect a selection of one of the sixteen inputs, the output being designated Tn and being available for a number of different purposes, such as to trigger loading of the tolerance register, or to act as an operand in the accumulator logic.

An address decoder 106, having a four-bit programmable address flag ADR, which selects one of sixteen outputs, is used to select one of fourteen lines for the output of data. The fourteen are the twelve general purpose lines T4–T15 and the F and L lines. Two of the outputs of the decoder 106 are not used. Each of the fourteen outputs of the decoder 106 is connected as a control input to a corresponding one of fourteen MUXs 108. The "0" input of each of the MUXs 108 is supplied directly from the corresponding register. The "1" inputs are supplied from a common new data line 110, derived from the output of an eight-input MUX 112 having a three-bit control input designated WRS, for write source. This MUX 112 allows the selection of a source of data for writing onto a selected output line. The selection of sources includes: the Tn line from MUX 104, the T0 register directly, the A, I, D and L registers, the carry K signal, and the Mgt0 signal (match value greater than zero).

In any cell, it is possible to employ this logic to read from a designated general purpose register and, in the same cell, to write to the same general purpose register from a selected data source. The logic controlling the general-purpose registers provides an extremely versatile arrangement for manipulating match values and other data in the cell structure of the invention. Match values can be stored and retrieved in nested levels of complexity, and the treatment of commonly used F and L lines with the same logic facilitates many of the search functions.

MODES OF OPERATION

The hardware described in the foregoing sections is capable of operation in many different functional modes which, when combined and nested recursively, results in a large number of different possible search functions. However, for purposes of explanation, the search functions can be discussed in terms of their more general attributes. The simple search involving a simple string of characters has been discussed already and will be summarized in diagram form. The next level of complexity is the alternate string, similar to the simple case but searching for alternate patterns, such as CAT or DOG within the same text stream.

Further complexity is added if searching is to be conducted within segments or windows of text. A window is any text segment defined by some pattern at its boundaries, such as a sentence, a paragraph, a document, and so forth. If one is searching for all the pattern matches within a sentence, for example, this is an example of a "fixed" window. The search might be to locate all the matches of CAT and DOG within a single sentence. The search processor would then examine each sentence for the presence of the desired search pattern, and would generate match signals for output from the processor in synchronism with the text stream.

A sliding window is one that "slides" along the text streams in looking for the desired pattern matches. For example, to find all the occurrences of CAT and DOG within three contiguous sentences. The sentences in which a match was found could be sentences 1-3, 2-4, 3-6, or any other three-sentence text segment, which helps explain why the segments are referred to as sliding.

Another optional attribute of search functions is the inclusion of simple enumerated conditions, such as:

"at least 1 CAT" and "at most 0 DOG"

or whether they are more complex enumerated conditions, such as

"at least 3 CAT" and " at most 2 DOG".

Another optional attribute involves matching for a subset of search terms or not. For example, to find at least 2 of CAT, DOG and MOUSE within a designated window, fixed or sliding, is a simple subset search in which the location of each term is limited to a simple enumeration of at least 1 or at most 0. A complex subset search involves such terms as:

"within 5 sentences (at least two of (at least three CAT, at least 4 DOG, at most 1 MOUSE))".

Note that this involves not only complex enumerated terms, but two nested levels of complexity.

Another optional attribute is the inclusion of arbitrary boolean expressions in the search definition, such as:

(CAT and DOG) or (KITTEN and PUPPY).

In the search processor of the invention, these attributes may appear in various combinations and in various levels of nesting or recursion. Discussion of all of the possible combinations would be impractical, but examples of the search function attributes will now be given.

Accompanying each of FIGS. 5a-15a are microcode listings giving the corresponding settings of the programmable flags in all of the cells of the search pattern. The convention used is that, if a flag is a single-bit flag, only its name is mentioned, as in LT. This conveys that the flag is set to a "1". For multi-bit flags, the flag setting is given, such as AF=6. All flags not mentioned are assumed to be zero.

SIMPLE STRING SEARCH

An example of the simple string search was given in the discussion of FIG. 3, in which match signals were generated for the search pattern CAT. FIG. 5 shows this search in diagram form. The letters C, A, T imply the existence of separate cells for each pattern character, and the letter M at the left-hand side of the diagram identifies the M line, which is the only line needed for the simple search. The numeral "1" under the C cell indicates that a tolerance of 1 is loaded into the M register of that cell.

Without the introduction of the concept of windows, the simple string search cannot be sensibly expanded in complexity except by adding the concept of alternation, as discussed in the next example. It makes little sense, for example to have a simple search of the entire text stream for the pattern CAT and not DOG. Even the search term CAT and DOG is of little practical use when applied to an entire text stream from a large data base, and not confined to a predefined text segment, such as a sentence or a plurality of consecutive words.

SIMPLE SEARCH WITH ALTERNATION

The example shown in FIG. 6 is for the alternate search: CAT or DOG or MOUSE. This search involves both the M line and the A line, and the vertical lines separating the search terms indicate alternation, i.e. the logical OR function. Again, a match value of "1" is loaded into the M line at the C cell of the CAT term. At the end of the CAT term, the match value from the M line is transferred to the A line, by selecting the Mgt0 signal in the MUX 80 of the accumulator logic (FIG. 4c), and by selecting the A function bits AF to copy the Mgt0 signal for output on the A line. It will be recalled that the accumulator logic provides for logically combining any selected operand with the value from the A register of the cell. In this case, the operand selected is the Mgt0 signal, indicating a non-zero match value, and the logical function selected in the AF bits ensures that the Mgt0 value is copied directly to the A output Ao without regard to the value in the A register. Thus the AF bits will be initialized to the values 0101, and the output signal Ao will be a "1" only when the operand Mgt0 is a "1". The match line is reset to "1" again at the start of the DOG term, by loading a tolerance value of "1" in the D cell of DOG. At the end of the DOG term the match line is ORed with the A line. Again this is accomplished with appropriate setting of the accumulator logic. Specifically, the Mgt0 signal is again selected as the operand, and the OR function truth table is programmed into the AF bits in the accumulator logic. Specifically, the AF bits are initialized to the values 0111, so that the output Ao will be a "1" when either or both of A or Mgt0 is a "1".

The same process is repeated for the MOUSE search term, with the match value from MOUSE being ORed with those from CAT and DOG on the A line, which then carries the desired result of the search. The logical OR operations can be combined with other cells, except for the last one in the alternation string. Therefore, the number of cells required is equal to the total number of characters plus one.

Figures 7A, 7B:
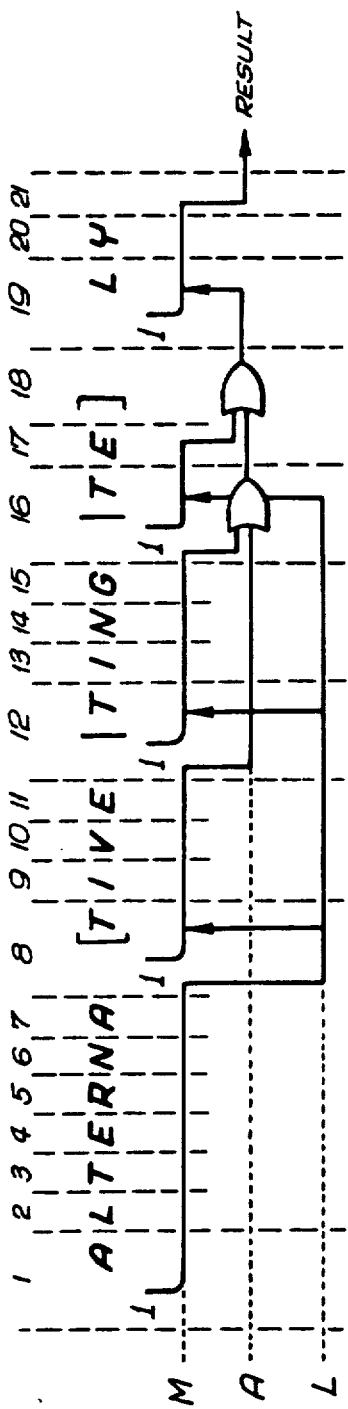

A more complex example of a simple string string search with alternation is shown in FIG. 7. The search is structured to locate matches for the words alternatively, alternatingly, and alternately. The match value from the common root "alterna" is saved on the L line, which is used to trigger loading of the M line with a match value of "1" at the start of each of the terms "tive", "ting", and "te". The results of these search terms are ORed together on the A line and the output of the three OR operations is used to load the M line one more time to search for the term "ly". More complex levels of nesting are possible, of course.

FIXED WINDOWS

FIG. 8 shows a simple case in which the search is for CAT and not DOG within one sentence. The first part of a fixed window search is to locate window boundaries. In the case of a sentence window, the boundaries are a period, a question mark, or an explanation point. Searching for these characters in the alternative is performed in the same manner as in the simple alternation search. The results are ORed together on the A line. Then the results of the sentence detection are transferred to the load line L, which is then used to trigger loading of a counter value at the end of each of the search terms CAT and DOG. The search terms have match values loaded at their starting character cells, and generate a match value on the M line if a match is detected. This match value, if greater than zero, is used to decrement the counter in the cell following the search term. Basically, this is accomplished by initializing the counter logic using a DEC flag of 001 to select the Mgt0 input to the MUX 96, the output of which is used to decrement the counter. If one CAT is found, for example, the counter is decremented to zero, and the zero condition of the counter is used to place a "1" on the A line. A stream of "1's" will continue to be placed on the A line until the next sentence separator is encountered. In the case of the DOG search term, the detection of a DOG pattern will be negated before being ANDed with the A line, since the required search was for not DOG. The logical combination of A and not-the-operand is effected by an appropriate setting of the A function lines AF in the accumulator logic.

Figure 9B:
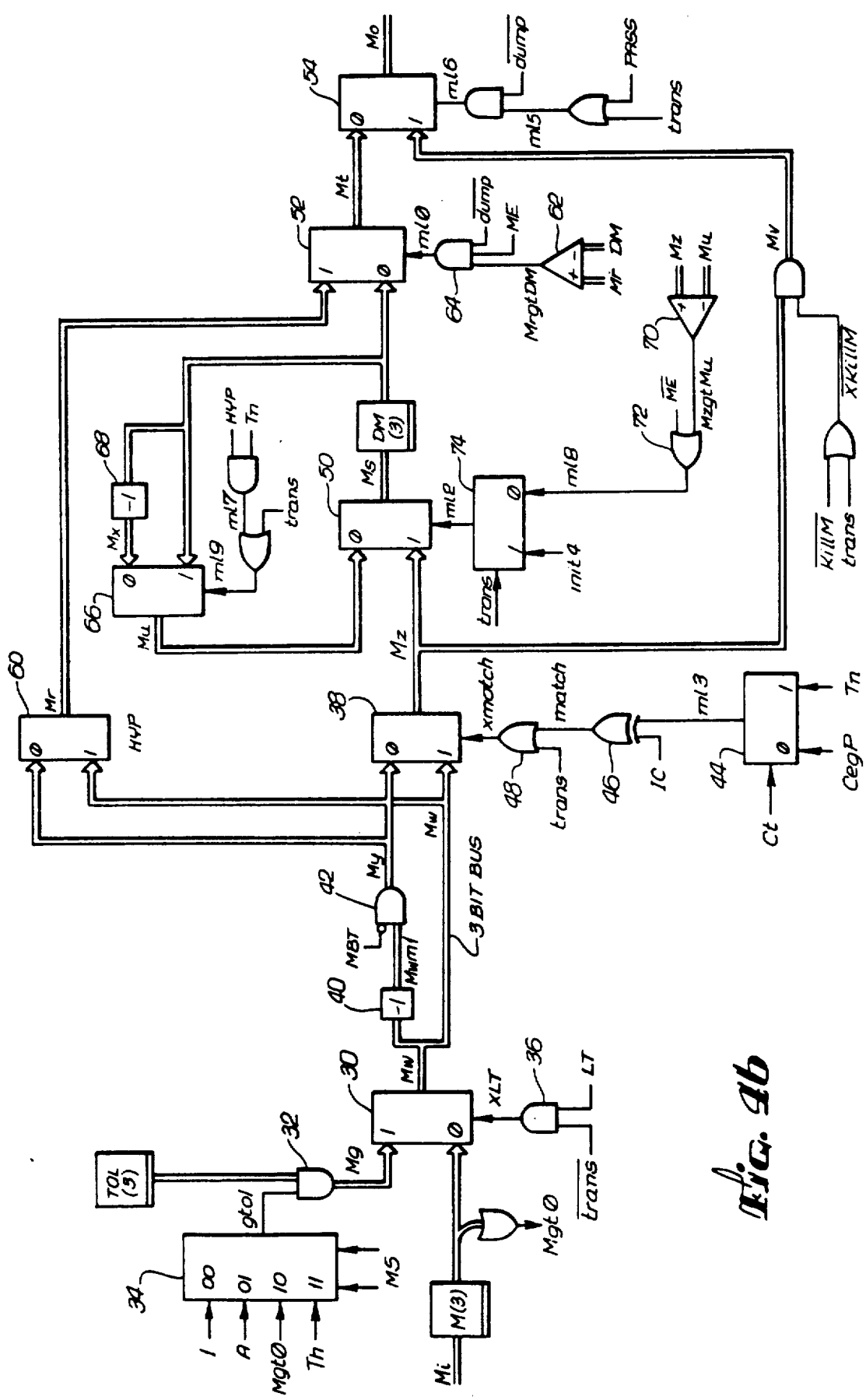
Figure 9D:
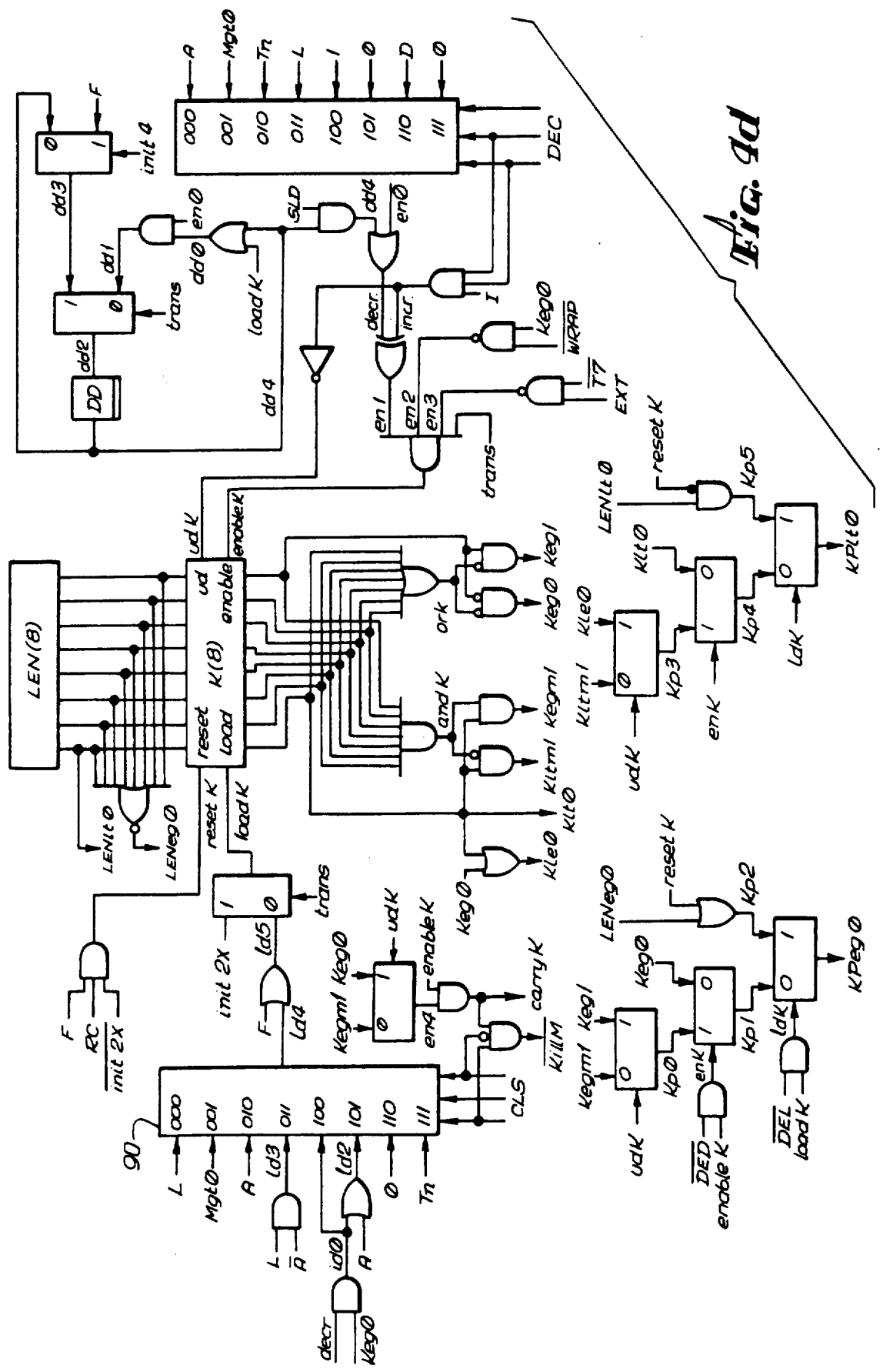
Figures 9A, 9B:
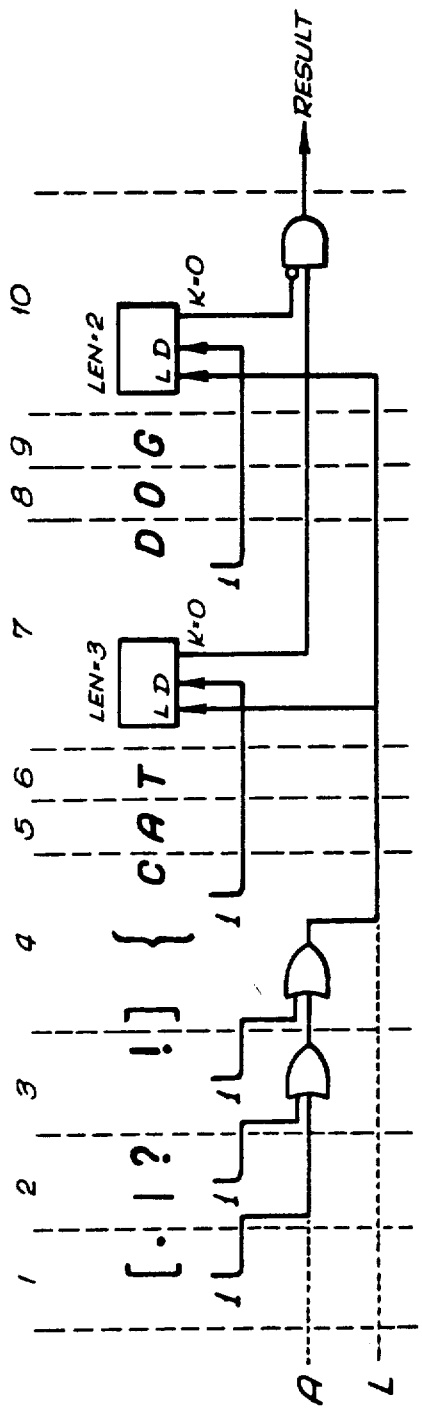

A more complex case using a fixed window is shown in FIG. 9. The search is for, within one sentence, at least 3 "cat" and at most 1 "dog". This works similarly to the case shown in FIG. 8, except that the counters are loaded with values greater than one, to take care of the enumerated conditions of the search. As in the previous example, loading of the counters is effected by means of a signal from the load line L, which carries an indication of sentence boundaries. The counter length register LEN(8) is previously initialized to the desired value, and the presence of a "1" on the L line is detected by means of the MUX 90, which has its control inputs from the flag CLS set to 000 to choose the L line as the signal source that will trigger loading of the counter from the length register. The "dog" counter is, by this means, set to "2" so that the detection of two "dog" terms will result in disabling the ANDed output on the A line. If at least three "cat" terms are detected, and at most one "dog" term, the match result from the AND operation on the A line will produce a match value of "1".

In these searches, the streams of "1" values placed on the accumulator may span a relatively large portion of the sentence, even when ANDed together with other terms. To reduce the number of match conditions that are produce from perhaps a single occurrence of the desired combination of search terms, the A line may be ANDed with the sentence separator signals on line L, to provide a single output match signal for the entire sentence segment. This ANDing function is performed in the same way as the other logical operations in the accumulator logic. The multiple match values appear on the A line and, in a separate cell, the accumulator logic is programmed to select the L line as operand, by initializing the OS flag to 100, and the AND function is selected in the MUX 82, by initializing the AF flag to 0001.

SIMPLE SUBSETS WITHIN A FIXED WINDOW

Figures 10A, 10B:
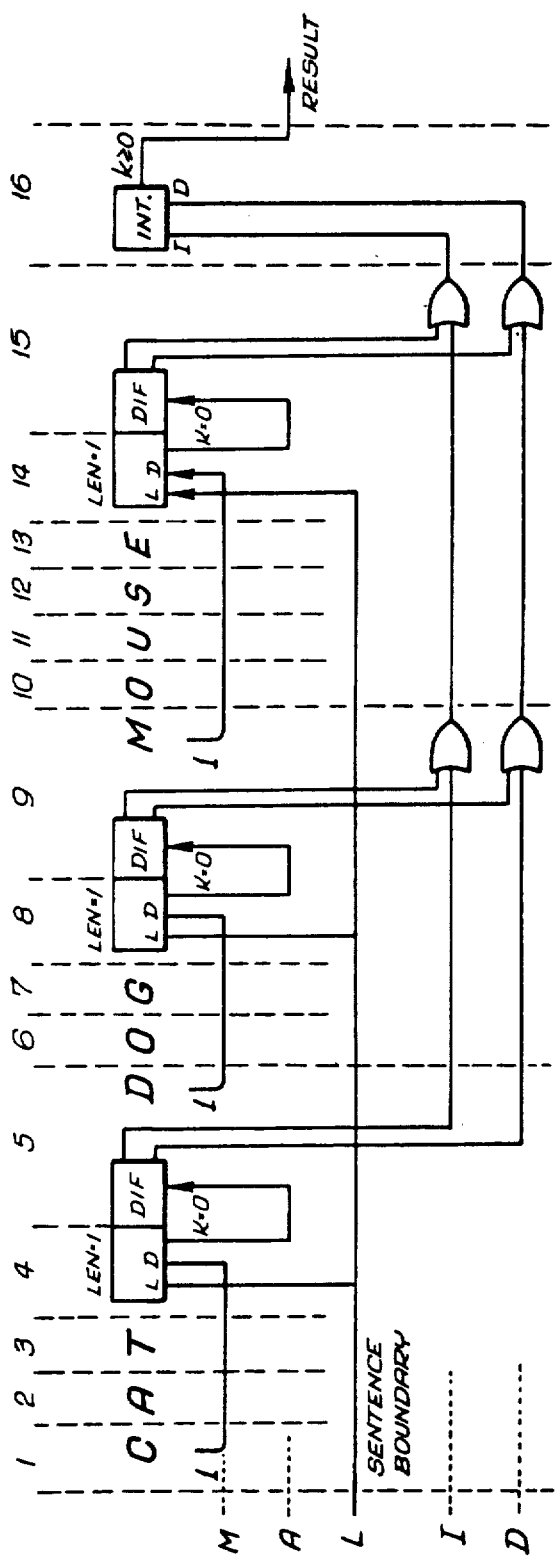

FIG. 10 shows a simple subset search within a fixed window. As in the previously discussed fixed window case, window boundaries, such as sentence endings, are detected by a number of alternate character patterns. Match values are generated on the M line and transferred to the load line L. The load line is used to load a counter with a "1" at the end of each search term to be detected. In the example, the search query calls for locating at least two of the set of terms CAT, DOG and MOUSE within the fixed window. When a match is detected for one of the terms, its match line is used to decrement the counter following the term. Thus, if one CAT is detected the corresponding counter is decremented to zero. If more than one CAT is detected in the same sentence, then the counter will still indicate a zero, since all of the counters are of the type that "stick" at zero rather than wrap around to a negative count of one.

The accumulator logic in the cells at the end of each search term are configured to place a "1" on the A line in the event of a zero count being detected. Following each of these cells containing a count is another cell, configured as a differentiator, i.e. it monitors the status of the A line and generates signals indicative of changes in the A line from )"0" to "1" or from "1" to "0". More specifically, the differentiator cell generates a "1" on the increment line I when A changes from "0" to "1" and generates a "1" on the decrement line D when A changes from "1" to "0". Configuring a cell to perform this function only requires the setting of a differentiator flag DF to enable the appropriate logic associated with the increment and decrement lines. When the A line goes to "1" because of the detection of one of the search terms, such as CAT, the associated differentiator cell generates a "1" on the increment line I. The A line as seen by the differentiator cell will remain at "1" because the counter will remain at zero, even if further CAT terms are detected. However, at the end of the sentence, or other defined window, the counter will be reset to "1" and the A line will drop to "0". This will result in a "1" being generated on the decrement line at the end of the sentence.

At the end of the search pattern is a single cell acting as in integrator. It receives the I and D lines and has a counter initially loaded with −n at the start of the search, where n is the number of items to be found in the subset. For example, if the search is to locate at least two of the set CAT, DOG and MOUSE, the integrator is initially loaded with −2. Whenever one of the search terms is located and "1" appears on the I line, the integrator counter is incremented, i.e. it becomes less negative by one. If any two of the search terms are located within the window, the integrator counter becomes zero. Its A logic is configured to place a "1" on the A line when the counter K is greater than or equal to zero. Therefore, the output from the search query is obtained on the A line.

Note that the counter in the integrator need not be reset between sentences, since the detection of every search term will result not only in the generation of a "1" on the I line, but also in the subsequent generation of a "1" on the D line at the end of the sentence. Therefore, the counter in the integrator cell is self-resetting from window to window. For practical reasons, however, the integrator is reloaded at the end of a fixed window, to avoid the possible collisions resulting from multiple decrement signals at the end of a sentence.

Since two or more of the search terms could match at coinciding times, collisions could result on the I line. A simple example of a search query resulting in collision would be to find at least two of the set AT, HAT, and THAT. If the word THAT appeared in the text, a match would be generated whenever the last T passed the end of a search term. Therefore, the last T would want to keep picking up match signals as it passed along the search pattern, and there would be a conflict for the use of the I line. Such a collision would result in the non-detection of one or more of the terms and an incorrect search result.

To minimize this possibility, the collision avoidance logic in the D line and I line logic includes an IP or I-pending flag and a DP or D-pending flag. If the condition of the A line calls for the generation of a "1" on the I line, but I register is already in a "1" condition, the collision avoidance logic sets the IP flag, which stays set until the I register returns to zero, indication an open "slot" for inserting the pending I line "1" condition.

The effect of this logic is that some of I and D signals may arrive at the integrator cell later than they should if there were no potential for collision. The alternative would be to employ more lines for I and D lines, but this would add to the cost of the cells without improving its functionality in any practical sense. Searches that are likely to provoke collisions are easy enough to recognize and avoid, and the collision avoidance logic provides a reasonable solution without seriously affecting the integrity of the search results.

A further level of complexity is added to the simple fixed window search if the search is for enumerated search terms, such as: within one sentence, at least 2 of (at least 3 CAT, at least 4 DOG, at most 1 MOUSE). The same principal is used, except that the counter following each search term is loaded with a value that may be greater than one. Also the "at most" terms are handled by different logic in the counter cell following the search term, such that the sensing of A line transition is inverted. Also, for an "at most" term the counter is set to one more than the term specifies, i.e. to "2" in this example. This results in the generation of a "1" on the D line on the detection of two or more MOUSE terms. As before, a "1" is generated on the I line when the specified number of "at least" terms is detected.

The integrator cell operates as before to integrate the I and D signals, but its initial value is selected to take car of the "at most" terms. In the example, the "at most 1" term is already satisfied before the search starts, so the count in the integrator cell is initialized at −1. Satisfying either of the other terms would result in a match, but if two of the term MOUSE were found in a sentence, the "at most" term would become unsatisfied, and the integrator count would be decremented by a "1" on the D line.

SIMPLE SLIDING WINDOW SEARCH

Figure 11A:
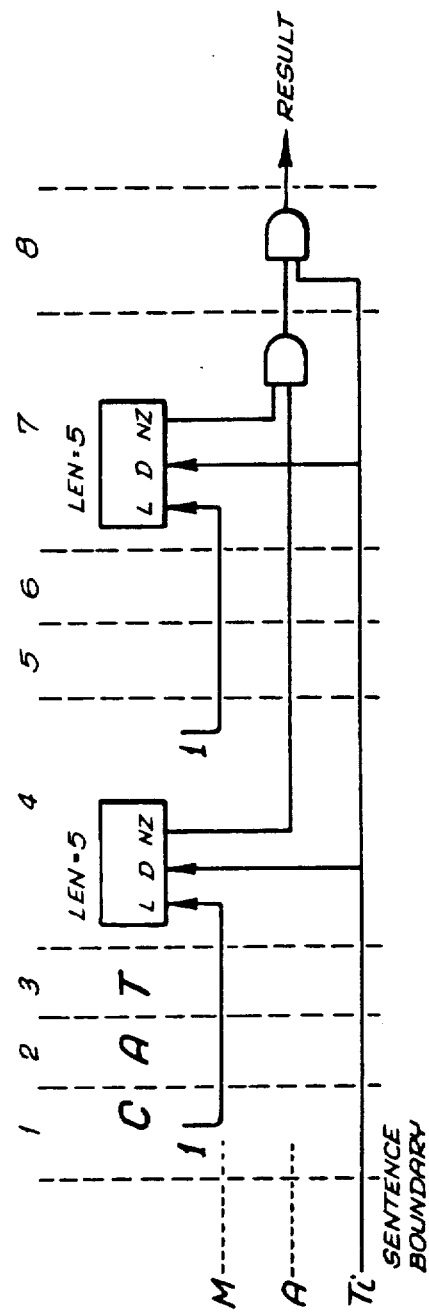
FIG. 11a is a diagram showing a search for simple designated conditions within a sliding window.
Figure 11B:
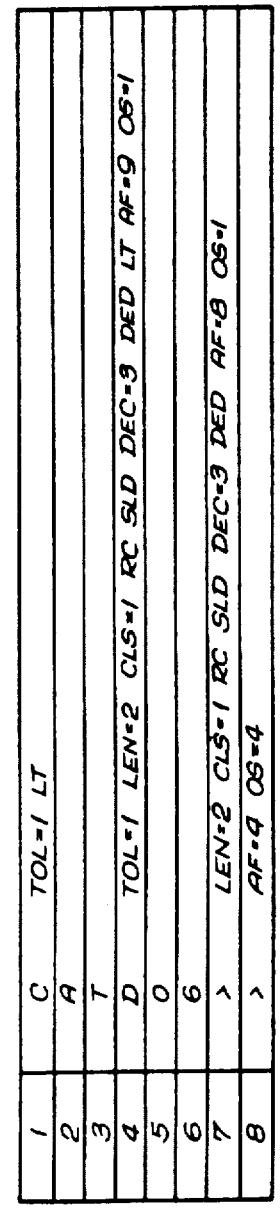

FIG. 11 is an example of a simple sliding window search, for locating within five sentences a combination of search terms. Each term in the simple search must be either an "at least 1" term of an "at most zero" term, which is equivalent to a negation. For example, CAT and DOG is the search request shown in the FIG. 11 diagram. It will be recalled that, in the fixed window search, the segment boundaries are used to load counters, which are then decremented by match results on the M line. In the sliding window search, the detection of segment boundaries is used to decrement counters, which are loaded by the detection of a search term on the M line. The search pattern comprises each of the terms followed by a counter cell. For example, upon the detection of CAT in the text stream, the resulting non-zero value on the match line is used to load the counter in the following cell. Then each subsequent segment boundary, which was previously detected on the M line and transferred to a T line, is used to decrement the counter. In this case, the counter was loaded with a value of five. After five sentences have passed, the counter will have been decremented to zero. The counter values are logically combined by detecting a non-zero counter value and ANDing it with other non-zero counter values on the A line, using an appropriate configuration of the accumulator logic. Accordingly, the A line will be used to output the result of the search.

Since the ANDing of even a number of search terms may still produce large strings of matches from the processor, it is desirable to reduce the number of matches by ANDing the result on the A line with the sentence boundary signal still saved on the T line. For further match reduction, the preferred embodiment of the invention produces only one match for every n segment separators, where n is the width specified for the sliding window.

COMPLEX SLIDING WINDOW SEARCH

The simple sliding window search is very much complicated by the introduction of enumerated terms within the search query, such as: within five sentences, at least 3 CAT and at least 3 DOG. The search is diagrammed in FIG. 12.

Again, the segment boundaries are detected on the M line in an earlier portion of the search pattern, and the segment boundary signals are saved on a T line and used to decrement counters. In the complex case, however, it is necessary to keep track of last n occurrences of a search term, where n is the number in the expression "at least n". For example, if the search is for at least 3 CAT, the processor has to keep track of the most recent three occurrences of the term CAT, and to determine whether all three were in the designated sliding window. This requires that there be three counters for the CAT term and, if the other term is at least 3 DOG, there must be three counter cells for the DOG term. In the general case, every "at least n" term requires n counters to determine whether the most recent n occurrences of the term is within the sliding window.

Figures 12A, 12B:
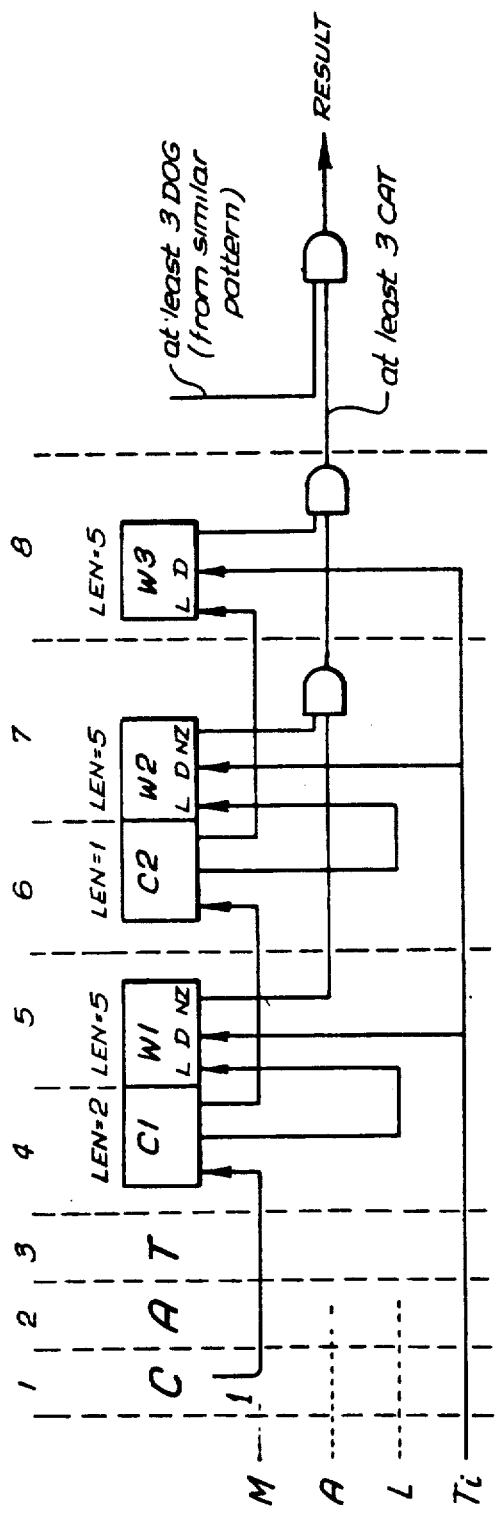

FIG. 12 shows the logic required when n=3. Following the CAT pattern in the cell string, is a first cycling counter C1. Its purpose is to count the number occurrences of CAT and to take special action on every third occurrence, when the cycling counter is zero. The special action is to zero out the match line, so that the match value goes no further along the cell pipeline, and to place a "1" on the L line, and to reload the cycling counter from the LEN register. The other two occurrences in every three match values for CAT are passed along the match line to the following cells, and cause the cycling counter to decrement by one. When the L line becomes a "1", this is used by a first window counting cell W1, immediately downstream of the cell C1, and results in the cell W1 having its counter loaded with the number of segments in a window, in this case the number +5. On each subsequent occurrence of a segment boundary, identified as a signal on line Ti, the counter in W1 is decremented. So long as the counter remains non-zero, this indicates that the term CAT detected by cell C1 has occurred within the sliding window.

Next in the pipeline is a second cycling counter C2, the purpose of which is to detect every second occurrence of cat reaching it after the cell C1 has removed every third occurrence. For this purpose, the cell C2 is loaded with a count of +1 and is counted down to zero. Cell C2 is detecting every other of the remaining occurrences of CAT and is therefore also processing every third occurrence of the original occurrences of CAT. As in the case of cell C1, cell C2 clears the M line on detection of one of the CAT strings, and places a "1" on the L line, which is detected in the next cell W2, and used to load the counter in that cell. Cell W2 also counts segment boundaries and remains non-zero so long as at least one of the detected CAT strings has occurred in within the designated window.

After cells C1 and C2 have "taken" two of every three matches of the term CAT, the remaining one of every three matches passes through to the last cell in the sequence, which is a third window counter W3. This counter is loaded directly by the match line, and is decremented by the segment boundary signals on the Ti line. Again, so long as a detected match has occurred within the specified window a non-zero count will be present in the cell W3. The desired match condition is obtained by logically ANDing the three non-zero-counter conditions from cells W1, W2 and W3, on the A line of the processor.

It is only necessary to initialize the cycling counters once at the beginning of a search. They are either reset to zero or loaded from the LEN register by the F line.

Set searches may also be conducted within a sliding window, using the differentiator and integrator cells described in the fixed-window subset searches.

LINKED WINDOWS

Figures 13A, 13B:
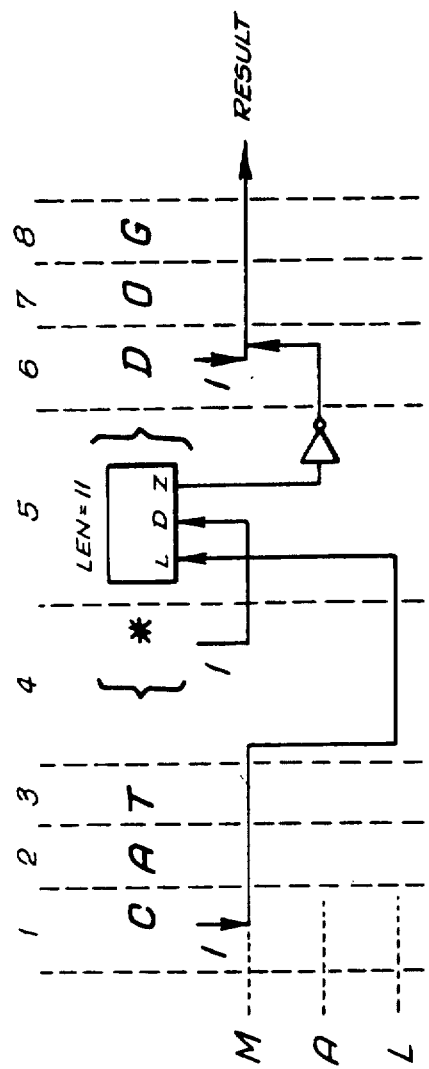

A linked window is a more generalized form of a fixed window. In a fixed window, a single pattern defines both the beginning and the end of the window. However, it is also possible for a window to have different starting and ending patterns. FIG. 13 illustrates the query CAT {at most 10*} DOG, where the * character matches every text character. This pattern matches every occurrence of DOG following an occurrence of CAT within the preceding ten characters. In this example, the string CAT is matched and the match result moved to the L line. The cell following the CAT pattern is initialized with all bits of the MASK register set to "1", such that it matches every character in the text. The match output signal Mo is, therefore, always "1". The next cell in sequence has a counter that is loaded with a count of 11 (decimal) when loading is triggered by a non-zero value on the L line. The counter is decremented by a non-zero value in the M line. After the detection of CAT and the loading of the counter, there will be a stream of decrementing signals applied to the counter, since the output of the preceding cell is always a "1". The value of the counter is monitored by the next following cell, of which the accumulator logic is initialized to generate a "1" output on the A line only if the counter value is non-zero. Thus, the A line in the cell following the counter will supply a string of ten "1's" following the detection of the string CAT. In the D cell of the pattern DOG, the tolerance register is loaded upon detection of a "1" on the A line. Therefore, the match value is continually loaded during the ten characters following CAT, and a match will emerge from the entire search pattern if a DOG string is detected as a result.

Figures 14A, 14B:
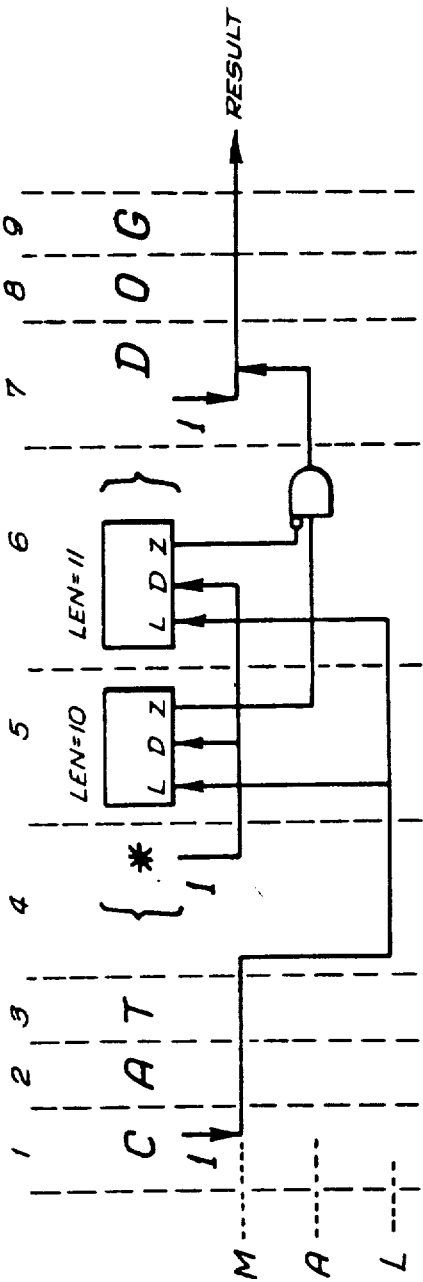

This type of search is also known as a "variable-length don't-care" search. DOG will match only if the first letter of DOG occurs within ten characters of the last letter of CAT. Fixed-length don't-care searches can be handled by the same mechanism. For example, the pattern CAT {at least 10 and at most 10*} DOG matches DOG only if a CAT matched exactly ten characters before the D of DOG. This search is illustrated in FIG. 14. As before, CAT is matched and the result moved to the L line. The match-all cell generates a stream of "1's" on the M line, which is used to trigger loading of two subsequent counters. The first counter is loaded with a count of ten and is decremented by the match line, generating a count-equals-zero signal on the A line. This computes the condition "at least 10." The second counter is loaded with a count of eleven and is also decremented by the M line. Its count-equals-zero value is inverted and ANDed with the A line value derived from the first counter. The second counter generates an "at most 10" signal, and the logical AND of the two signals from the counter cells produces a single "1" ten characters after the T in CAT. This match is used to trigger the loading of a match value for the DOG search. Therefore, DOG will match only if it begins exactly ten characters after the end of CAT.

This technique is arbitrarily extendable to allow for any combination of ranges. Thus, CAT {3 to 4 or 9 to 12 *} DOG matches DOG only if CAT matches 3, 4, 9, 10, 11 or 12 characters previously.

Variable and fixed length don't-cares can also be handled by a similar technique. Thus, CAT {at most 10 * and no ∧ .} DOG matches on DOG only when a CAT has matched within the last ten characters and all the characters are periods. The ∧ . pattern indicates a cell which matches all characters except a period. This is accomplished by setting the pattern register to a period, and setting the IC or invert-comparison flag, to invert the sense of the comparison. Thus, linked windows provide an extremely versatile mechanism for matching a variety of pattern types, of which fixed and variable length don't-cares are just special cases.

EXTENDED COUNTERS

A search processor cell array can be configured in such a way as to link counters of adjacent cells together, to form a single virtual counter with N times as many bits as a single counter, which has eight bits, where N is the number of such adjacent counter cells. These extended counters can be used in most places that a single-cell counter is used. The only exception is the cycling counters used in complex sliding windows. However, there is little practical need for a large cycling counter.

The mechanism for extending counters is illustrated in FIG. 15a. This is a 32-bit long aggregate counter which counts down from one billion and sticks at zero, producing 1's on the A line while it is at zero. It is loaded by L and decremented by M.

The basic mechanism is to have the first counter in the chain count the lowest eight bits, the next counter the next eight bits, and so forth, the last counter handling the highest eight bits. The carry bit out of the first counter is written onto the T7 line using the WKC (write K carry) flag. This carry is ANDed with the M signal in the next counter stage to yield the decrementing signal for that counter stage, through use of the EXT (counter extension) flag in that stage. The carry is again written to the T7 line for use by the next counter stage in the chain. All but the last counter stage have the WRAP flag set, which causes the counters to "wrap around" at zero, counting from zero to $-1$ or 255 decimal in the eight-bit counter stage. When the most significant counter stage reaches zero, it sticks at zero, and keeps producing "1's" on the A line until it is reloaded. The lower counter stages keep on counting but have no effect on the most significant stage. Note that the top counter stage reaches zero just after the lower stages have each wrapped around to 255. The top stage, then, reaches zero when the counter as a whole reaches $2^{8(N-1)W}-1$, where N is the number of stages in the counter. To compensate for this, $2^{8(N-1)}-1$ must be added to the aggregate LEN register, so that when the top stage reaches zero, the correct number has been counted.

A similar method can be used for sliding window counters and subset counters. Thus, the small size of the processor counter register does not impose any practical limitation on the power of the processor to perform search operations involving counting in large numbers.

RESULT COLLECTION

As mentioned earlier, one goal of the present invention is to provide a processor capable of responding to a large number of search queries during a single pass of the text stream. This is facilitated by means of a result pipeline that parallels the cell pipeline already described in detail. The result pipeline logic has the following favorable properties: a) It is easily extendable to handle any number of simultaneous search queries. b) It handles collisions in an optimal way, such that different queries matching on the same character do not cause a collision. c) Up to six collisions in a row can be compensated for without causing incorrect results. Assuming that matches are solitary (one at a time) and random, the chance of over six collisions in a row is extremely small. However, when the collision avoidance does fail, the failure is always detected d) It requires a minimum of logic external to the cell hardware itself and the hardware can work at very high speeds.

Figure 16:
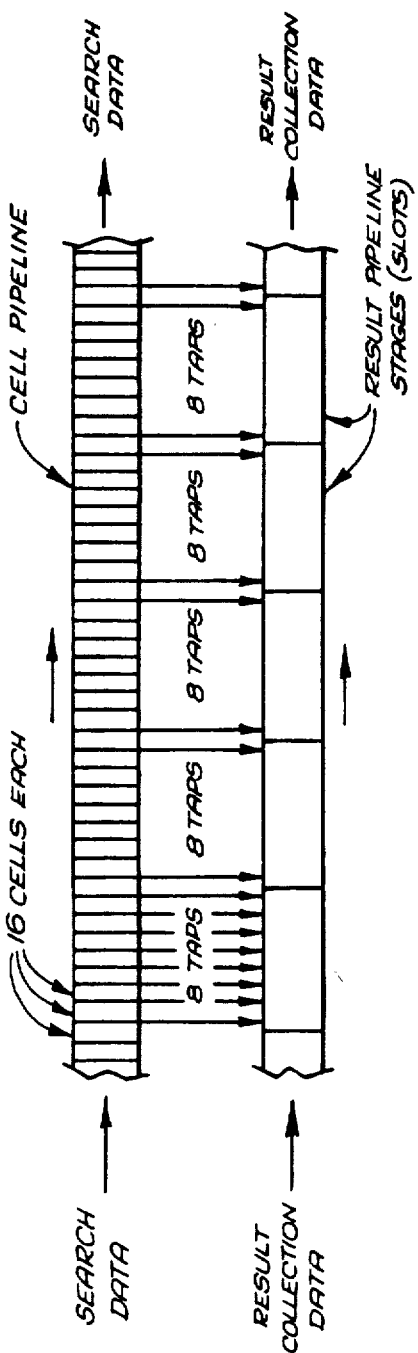
FIG. 16 is a block diagram illustrating the result collection pipeline of the invention.

The result pipeline, which is shown in diagrammatic form in FIG. 16, is sixteen bits wide. One bit carries a slot-empty signal, three bits carry a result tag, to be explained, and the remaining twelve bits are used to carry a tap address that indicates the source of the results carried in the pipeline.

In the presently preferred embodiment of the invention, there is a result tap after every sixteen serially connected cells, and every eight of such taps are connected with a single delay stage of the result pipeline. This means that the result pipeline, if clocked at the same rate as the cell pipe-line, moves data at 128 times the speed. Thus, there may be as many as eight results, from eight result taps, contending for a single delay stage, or slot, of the result pipeline.

Figure 17:
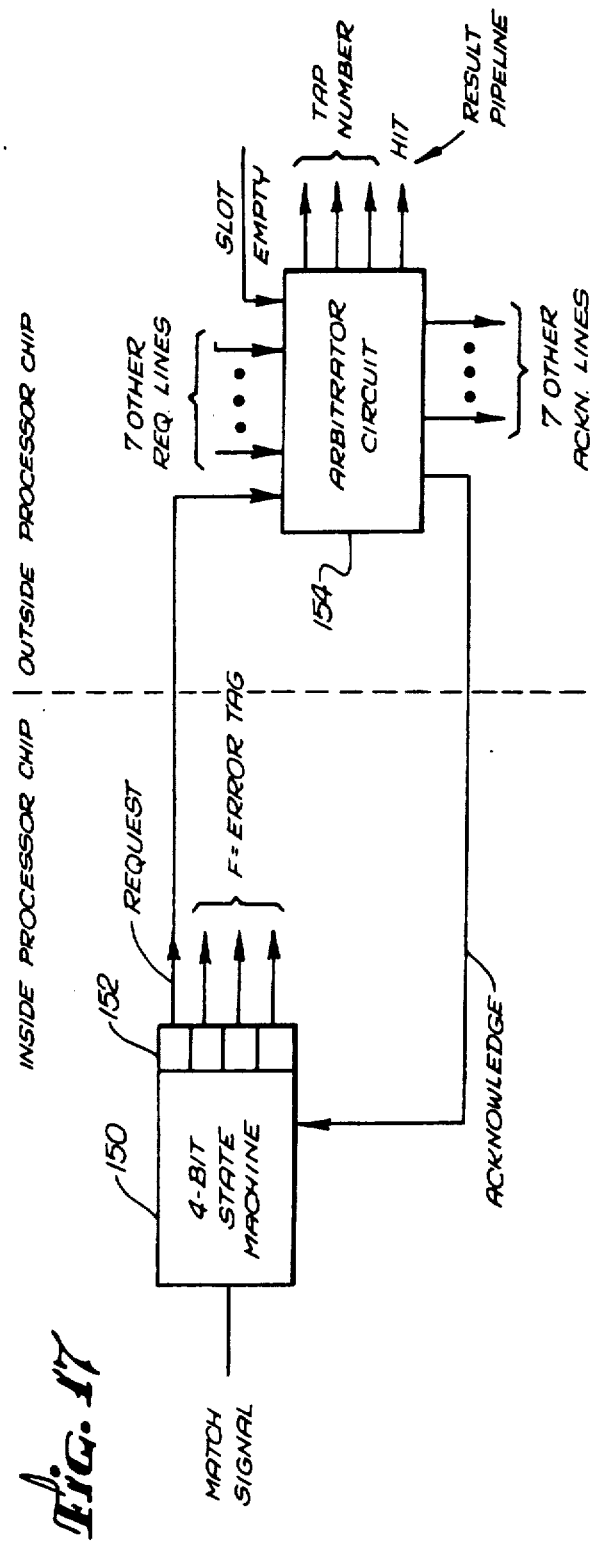
FIG. 17 is a block diagram illustrating the result tap logic employed in the processor.

The manner in which result taps operate is illustrated in FIG. 17. A match signal from one of the result taps, of which there are one for each sixteen cells, is input to a four-bit state machine 150. The state machine 150 has a four-bit state register 152, one bit of which is used to store a request signal, and the other three bits are used to store a result tag F. When a match signal arrives from the cell pipeline, a request is made to an arbitrator circuit 154 for an open slot in the result pipeline. Also the request bit of the state register is set to a "1". The three F bits are initially zero. The arbitrator circuit 154 receives requests from as many as eight result taps, and acknowledges them only one at a time. In the event of a conflict, the arbitrator selects the earliest request for a slot and acknowledges it first. In any event, the arbitrator acknowledges only one request for each slot that it has available on the result pipeline If the state machine does not receive an acknowledgment signal within the current time cycle, it increments its three-bit F field by one and continues to wait for an acknowledgment. If one is received in the next clock cycle, this means that the arbitrator circuit was able to place the request on the result pipeline, but one clock cycle after the request was made. The state machine continues to increment the F counter so long as no acknowledgment is received, and may count up to a maximum of six (110 binary) in the three F bits of its state register. If the request has to wait for seven cycles or more, the situation is considered to be an error condition. Moreover, if another match signal is received from the cell pipeline while a request is still pending with the arbitrator circuit, a count of seven is placed on the F bits to indicated a conflict that cannot be resolved. When an acknowledgment is received, the data placed on the result pipeline includes the F count as a result tag, indicating the degree of error or offest in the timing of the match information, and a twelve-bit result tap address to indicate the location from which a match signal was derived.

The result pipeline structure permits as many as hundreds of search queries to be processed simultaneously with little chance of serious error. The structure is simple and yet allows for the collection of results from a large number of result taps, Moreover, the prospect of a failure caused by collision of results is statistically extremely unlikely. In any event, an errors of this type can be tolerated, and handled by the occasional rerunning of a search query.

INITIALIZATION

The final topic for consideration is the mechanism whereby the cells in the search processor are initially loaded before a search is executed. This exact technique employed in this process is not considered part of the claimed invention, and is, therefore, discussed only in general terms. Basically, initialization is performed by shifting initialization data into the cell pipeline by configuring it as a shift register using the control signal designated "trans". Then, by using a combination of control signals designated "dump", I0 and I1, the initial data values are gated from the registers in the lines of the cells, into the various registers and programming flags of the cells. The initialization phase is controlled by three control lines, designated "dump", I1 and I0. The states of these lines control the function performed by the processor, as indicated as follows:

| dump | I1 | I0 | Function |
|---|---|---|---|
| 0 | 0 | 0 | Normal operation search mode |
| 0 | 0 | 1 | Pass 1 initialization pulse |
| 0 | 1 | 0 | Pass 2 initialization pulse |
| 0 | 1 | 1 | Pass 3 initialization pulse |
| 1 | 0 | 0 | Internal state multiplexed to datapath lines |
| 1 | 0 | 1 | Reset dummy cell datapath |
| 1 | 1 | 0 | Preset dummy cell datapath |
| 1 | 1 | 1 | Pass 4 initialization pulse |

The following table shows the correspondence between the data lines which receive the initialization data and the flags or registers in which that data is stored during the initialization phase. Because the number of internal flags and registers exceeds the number of data lines, four passes are required to initialize all of the flags and registers. For example, in the first pass the pattern register bits PAT0–PAT7 are loaded through the character register C0–C7.

| Data lines | Flags and registers to initialize | | | | |
|---|---|---|---|---|---|
| Datapath register | Pass 1 (init1) | Pass 2 (init2) | Pass 3 (init3) | Pass 4 (init4) | dump |
| C0 | PAT0 | MASK0 | PASS | | |
| C1 | PAT1 | MASK1 | ME | | |
| C2 | PAT2 | MASK2 | LT | | |
| C3 | PAT3 | MASK3 | MBTB | | |
| C4 | PAT4 | MASK4 | HYP | | |
| C5 | PAT5 | MASK5 | CT | | |
| C6 | PAT6 | MASK6 | IC | | |
| C7 | PAT7 | MASK7 | — | | |
| M0 | TOL0 | MS0 | — | DM0 | DM0 |
| M1 | TOL1 | MS1 | — | DM1 | DM1 |
| M2 | TOL2 | — | — | DM2 | DM2 |
| A | OS0 | OS1 | OS2 | DA | |
| I | DF | CLS0 | IDS0 | IP | IP |
| D | FX | IDFB | IDS1 | DP | DP |
| L | LEQT | EXT | WRAP | DL | |
| F | WRS0 | WRS1 | WRS2 | DD | DD |
| T11 | K0 | AF1 | LEN0 | | K0 |
| T9 | K1 | AF0 | LEN1 | | K1 |
| T8 | K2 | AF3 | LEN2 | | K2 |
| T10 | K3 | AF2 | LEN3 | | K3 |
| T15 | K4 | DEL | LEN4 | | K4 |
| T13 | K5 | DED | LEN5 | | K5 |
| T12 | K6 | CLS1 | LEN6 | | K6 |
| T14 | K7 | CLS2 | LEN7 | | K7 |
| T4 | DEC0 | DEC1 | DEC2 | | |
| T5 | SLD | WKC | ADR0B | | |
| T6 | RC | — | — | | |
| T7 | ADR3B | ADR1B | ADR2B | | |

The dump function is one in which the internal states of various registers can be multiplexed onto the datapath lines, for diagnostic purposes.

AUTOMATED INITIALIZATION

Although the programmable state registers and flags within the processor cells can be programmed by any available means to initiate a search, the processor structure lends itself easily to the use of a compiler language to formulate the initial settings of the cells, based on a description of the search query, which can be in a meaningful higher-level language. This has been accomplished, but is not considered part of the invention as presently claimed:

SUMMARY

From the foregoing description of exemplary functions and of the detailed hardware structure of the invention, it will be appreciated that the search processor can be operated in a wide variety of modes, to accommodate a wide variety of search formats and function. The ability of the processor to handle missing, extra, and incorrect characters is one of its most important features. But when this is coupled with the ability to perform simple and complex searched within fixed or sliding windows in the text stream, it becomes clear that the invention is an extremely powerful search processor. Not only can it handle a variety of complex search functions, alone and in combination, but it is capable of operation at extremely high speed, the characters being streamed through the processor at a rate of approximately 15 megahertz.

It will be appreciated that, although a specific embodiment of the invention, and some specific examples of its functions, have been described in detail for purposes of illustration, various modifications may be made without departing from the spirit and scope of the invention. Accordingly, the invention is not to be limited except as by the appended claims.

We claim:

1. A special-purpose search processor, comprising:
   a plurality of serially-connected cells, each cell including
      a pattern register for storing a character of a pattern to be searched for,
      a character register for storing a character of a data stream to be searched,
      match logic, including a comparator for generating a cell match signal by comparing the character stored in the character register with the character stored in the pattern register, and
      a match register for storing a match value indicative of a match between a search pattern and the data stream, and for registering any mismatch indicated by the cell match signal;
   means for connecting the character registers of the plurality of cells serially together to form a character line;
   means for connecting the match registers of the plurality of cells serially together to form a match line;
   means for initializing the cells to contain the search pattern; and
   clock means for gating the data stream from cell to cell through the character line such that the search pattern and the data stream are oppositely oriented, and a first character of the search pattern is first encountered by a first character in the data stream;

and wherein characters in the search pattern are compared with characters in the data stream in a sequential manner, and match values are propagated along the match line in synchronism with movement of the data stream along the character line, to indicate exact and inexact matches between the search pattern and strings of characters in the data stream, and wherein inexact matches involve incorrect, missing or extra characters;

and wherein the match logic includes means for loading a tolerance value onto the match line, at a selected cell position in the search pattern, for transmission onto the match line as an initial match value, a delay match register connected to receive input from the match register and to provide output on the match line to a next cell in series, wherein the presence of the delay match register synchronizes movement of match values from cell to cell with movement of the data stream through successive potentially matching positions with respect to the search pattern, means interposed between the match register and the delay match register, for selectively decrementing the match value as it is transmitted to the delay match register, whenever a non-match is detected in a cell, wherein presence of a nonzero match value on the match line is indicative of a match, means for detecting missing characters in the data stream and adjusting the match value to record a degree of mismatch with the search pattern, wherein the means for detecting missing characters generates a first alternate match value based on an assumption that a character is missing from the data stream, and discards the first alternate match if the original match value is greater, and means for detecting extra characters in the data stream and adjusting the match value to record a degree of mismatch with the search pattern, wherein the means for detecting extra characters generates a second alternate match value based on an assumption that there is an extra character in the data stream, and discards the second alternate match if the original match value is greater.

2. A special-purpose search processor as defined in claim 1, in which the means for detecting missing characters includes:

means for providing a parallel match value path bypassing the delay match register, after decrementing the match value in the means for selectively decrementing, to yield an alternative match value that would be obtained if a character were missing from the data stream; and means for selecting between the parallel match value path bypassing the delay match register and a normal match value path through the delay match register, by comparing (a) the match value obtained from the means for providing a path bypassing the delay match register and (b) the match value obtained as an output of the delay match register, and choosing the greater of the two values (a) and (b) for output on the match line, selection of the value (a) being indicative of a missing-character condition.

3. A special-purpose search processor as defined in claim 1, in which the means for detecting extra characters includes:

means for providing a path feeding a match value back from output to input of the delay match register, and for decrementing the match value, to yield a match value that would be obtained if a current character were an extra character in the data stream; and means for selecting between the feedback path and a normal input path from the means for selectively decrementing the match value, by comparing (a) the match value fed back from the output of the delay match register and (b) the match value that would normally be input to the delay match register, and choosing the greater of the two values (a) and (b) for input to the delay match register, selection of the value (a) being indicative of an extra-character condition.

4. A special-purpose search processor as defined in claim 1, in which the match logic further includes:

means responsive to a must-be-there flag, for clearing the tolerance value on the match line if there is no match in a cell in which the flag is set.

5. A special-purpose search processor as defined in claim 1, in which the match logic further includes:

means responsive to an invert-character flag in the cell, for inverting the match signal obtained by comparing the pattern register and the character register.

6. A special-purpose search processor, comprising:

a plurality of serially-connected cells, each cell including a pattern register for storing a character of a pattern to be search for, a character register for storing a character of a data stream to be searched, match logic, including a comparator for generating a cell match signal by comparing the character stored in the character register with the character stored in the pattern register, a match register for storing a match value indicative of a match between a search pattern and the data stream, and for registering any mismatch indicated by the cell match signal;

an accumulator register for storing a binary value derived from an accumulator register of an adjacent cell, and accumulator logic for modifying a value contained in the accumulator register for output to a next cell, by combining the accumulator register with a selected condition of the cell, in accordance with a preselected logical function;

means for connecting the character registers of the plurality of cells serially together to form a character line;

means for connecting the match registers of the plurality of cells serially together to form a match line;

means for connecting the accumulator registers of the plurality of cells serially together to form a serial accumulator line;

means for initializing the cells to contain the search pattern; and clock means for gating the data stream from cell to cell through the character line;

and wherein characters in the search pattern are compared with characters in the data stress in a sequential manner, and match values are propagated along the match line in synchronism with movement of the data stream along the character line, to indicate exact and inexact matches between the search pattern and strings of characters in the data stream, and wherein inexact matches involve incorrect, missing or extra characters;

and further comprising a plurality of additional registers in each cell, corresponding registers being serially connected to form a plurality of additional lines through the cells for the storage and propagation of intermediate match signals;

and wherein the match logic is configured to detect boundaries between predefined segments of text, and the match logic and accumulator logic cooperate to provide means for locating selected search patterns in combination within one of the predefined segments of text.

7. A special-purpose search processor as defined in claim 6, in which:

the processor further includes a counter in each cell, and counter control logic for loading, incrementing and decrementing the counter; and the match logic and counter control logic include means for loading a selected counter to indicate a number of times that a search pattern string is to be located within a segment of text, and means for decrementing the counter each time the search pattern string is located, and means for transferring a zero counter value to the accumulator line to indicate a desired match of at least the number stored in the counter.

8. A special-purpose search processor as defined in claim 7, in which:

the means for loading the counter is responsive to detection of segment boundaries, whereby the counter is reset at the start of each new segment of text, to indicate the number of times that a search pattern string is to be located within the segment, and a desired search is thereby reinitiated at each new segment of text.

9. A special-purpose search processor as defined in claim 7, wherein:

the search processor is used to locate a desired subset of at least n terms of a set of m search terms within a specified text segment;

each cell includes an increment register and a decrement register, the increment register of each of the cells being serially connected to from an increment line and the decrement register of each of the cells being serially connected to form a decrement line;

the pattern registers are configured to define the m search terms and to provide a match value on a selected line indicative of the start of a text segment;

the match value indicative of the start of a text segment is employed to load the counter with a count of one in a counter cell immediately following each sequence of cells of which the pattern registers define a search term;

a matching search term causes decrementing of the counter in the next immediately following counter cell and generation of a "1" signal on the accumulator line;

each cell following a counter cell is configured as a differentiator, to provide a "1" output on the increment line whenever the accumulator becomes a "1", and a "1" output on the decrement line whenever the accumulator line becomes a "0";

a final cell following the m search terms functions as an integrator, having a counter initially set to a value −n, incremented by a "1" on the increment line, and decremented by a "1" on the decrement line, whereby location of the desired subset of terms is indicated by the counter in the final cell becoming zero.

10. A special-purpose search processor as defined in claim 9, and further including:

logic means associated with the increment and decrement lines, for avoiding possible collision between "1" values placed on the increment and decrement lines by cells associated with different search terms.

11. A special-purpose search processor as defined in claim 7, wherein:

the search processor is used to locate a combination of search terms within a sliding window of n text segments;

a sequence of cells corresponding to each search term generates a non-zero match value on the match line when a match is found for the search term, and this match value is employed to load the counter with n in the cell immediately following a sequence of cells of which the pattern registers define the search term;

cells immediately preceding sequences of cells of which the pattern registers define the search terms are employed to detect segment boundaries and to generate match values that are saved on one of the additional lines in the processor, and are employed to decrement the counters, whereby each counter will be counted down to zero after n segments of text have passed; and non-zero count indications from all of the counters are ANDed together in the accumulator line to provide an indication of the presence of all search terms in n successive text segments.

12. A special-purpose search processor as defined in claim 11, and further including:

means for reducing in number the match signals obtained from the processor.

13. A special-purpose search processor as defined in claim 12, in which:

the means for reducing the number of match signals includes means for ANDing the match values with selected ones of the segment boundary match values saved on one of the additional lines.

14. A special-purpose search processor as defined in claim 11, and further including:

means for counting the number of occurrences of each of the search terms, to permit detection of enumerated search terms within a sliding window of n text segments.

15. A method of searching for selected patterns in a text stream, using a plurality of serially-connected comparison cells, the method comprising:

initializing each cell to contain a pattern character in a pattern register and various control flags, the pattern characters of the cells together forming a serial string of characters defining a search pattern;

applying a clocking signal to the cells to cause propagation of the text stream from cell to cell along a character line formed by a serial connection of character registers in the respective cells, wherein the search pattern and the text stream are oppositely oriented, and a first character of the search pattern is first encountered by a first character in the text stream;

comparing the character register and the pattern register in each cell, on each application of the clocking signal, to generate cell match signals indicative of matching character and pattern registers;

loading an initial match value, referred to as a tolerance value, onto a match line connecting the cells, at a selected cell location, the tolerance value being indicative of the degree of mismatch that will be tolerated between the text stream and the search pattern;

propagating match values from cell to cell along the match line;

selectively modifying the match value in each cell in response to the result of the comparing step; and outputting a match result indicative of the location of matching data in the text stream; wherein the step of modifying the match value includes decrementing the value on detection of incorrect, missing or extra characters in the text stream;

storing a first match result associated with a first search term of the search pattern on an additional line connecting the cells, wherein the storing step is performed in a cell corresponding to an end of the first search term;

generating a second match result relating to a second search term of the search pattern, wherein the generating step produces the second match result from a cell corresponding to an end of the second search term;

logically combining the first and second match results in a cell corresponding to a position downstream of the first and second search terms, for output from the serially connected cells;

detecting boundaries of predefined text segments within the text stream, using cells of which the pattern registers contain selected text boundary characters;

generating enabling signals in the cells in the step of detecting boundaries; and applying the enabling signals to other cells, thereby enabling search functions to be performed only within a fixed window of one text segment defined by the detected boundaries.

16. A method for searching a stream of text for a search pattern, comprising:

first storing a search pattern of textual characters in a serially connected plurality of comparison cells;

shifting the text stream character-by-character through the comparison cells in synchronism with a clocking cycle, wherein the search pattern and the text stream are oppositely oriented, and a first character of the search pattern is first encountered by a first character in the text stream;

comparing characters in the search pattern with characters in the text stream at each position of the text stream as it is shifted through the comparison cells;

producing cell match signals in the comparison cells as a result of the comparing step;

setting a match value initially to a selected tolerance value in a selected one of the cells;

receiving a match value from a neighboring cell at the same time as a text stream character;

decrementing the received match value if there is not cell match signal in the cell;

storing the received and possibly decremented match value for one clocking cycle;

then transmitting the stored match value to the next neighboring cell in sequence, wherein the match values are propagated through the comparison cells at half the rate of shifting the text stream through the comparison cells;

detecting exact matches between the search pattern and strings of characters in the text stream, by detecting match values that are propagated out of the cells with a value not diminished from the tolerance value; and detecting inexact matches in the form of incorrect, extra or missing characters in each character string compared with the search pattern, wherein the detection of incorrect, extra and missing characters is performed simultaneously and in each cell, and further includes the steps of selectively decrementing a match value in each of three alternate paths corresponding to the detection of incorrect, extra and missing characters, and selecting the greatest match value of three for transmission to the next neighboring cell in sequence.

17. A method as defined in claim 16, and further including the steps of:

storing a first match result associated with a first search term of the search pattern, and generated in a cell corresponding to the end of the first search term, on a match line connecting the cells;

generating a second match result relating to a second search term of the search pattern, in a cell corresponding to the end of the second search term; and logically combining the first and second match results for output from the serially connected cells.

18. A method as defined in claim 17, and further including the step of:

generating additional match results associated with additional search terms of the search pattern, which may be logically combined with the first and second search terms in a nested arrangement.

19. A method as defined in claim 17, and further including the step of:

counting occurrences of selected search terms, in counter cells associated with the selected search terms, to provide for the searching of enumerated conditions within the text stream.

20. A method as defined in claim 18, and further including the step of:

counting occurrences of selected search terms, in counter cells associated with the selected search terms, to provide for the searching of enumerated conditions within the text stream.

21. A method as defined in claim 17, and further including the steps of:

detecting boundaries of predefined text segments within the text stream, using cells in which the boundaries are stored as part of a search pattern; and generating enabling signals in the cells in the step of detecting boundaries;

applying the enabling signals to other cells, thereby enabling search functions to be performed only within a fixed window of one text segment defined by the detected boundaries.

22. A method as defined in claim 18, and further including the steps of:

detecting boundaries of predefined text segments within the text stream, using cells in which the boundaries are stored as part of a search pattern; and generating enabling signals in the cells in the step of detecting boundaries;

applying the enabling signals to other cells, thereby enabling search functions to be performed only within a fixed window of one text segment defined by the detected boundaries.

23. A method as defined in claim 19, and further including the steps of:
- detecting boundaries of predefined text segments within the text stream, using cells in which the boundaries are stored as part of a search pattern; and
- generating enabling signals in the cells in the step of detecting boundaries;
- applying the enabling signals to other cells, thereby enabling search functions to be performed only within a fixed window of one text segment defined by the detected boundaries.

24. A method as defined in claim 20, and further including the steps of:
- detecting boundaries of predefined text segments within the text stream, using cells in which the boundaries are stored as part of a search pattern; and
- generating enabling signals in the cells in the step of detecting boundaries;
- applying the enabling signals in the cells in the step of detecting boundaries;
- applying the enabling signals to other cells, thereby enabling search functions to be performed only within a fixed window of one text segment defined by the detected boundaries.

25. A method as defined in claim 17, and further including the steps of:
- detecting boundaries between predefined text segments within the text stream, using cells of which the pattern registers contain selected text boundary characters;
- counting text segments in cells set up as counting cells, to determine whether a search term has appeared within a specified number of text segments;
- counting occurrences of selected search terms within text segments, using further cells set up as counting cells; and
- generating a match signal only when specified search terms have appeared in combination within the specified number of text segments.

26. A method as defined in claim 25, and further including the step of:
- reducing in number the match signals generated, by ANDing the match signals with a signal derived from the boundaries of the predefined text segments.

27. A special purpose search processor for searching a stream of text for specified search patterns, the processor comprising:
- means for first storing a search pattern of textual characters in a serially connected plurality of comparison cells;
- means for shifting the text stream character-by-character through the comparison cells in synchronism with a clocking cycle, wherein the search pattern and the text stream are oppositely oriented, and a first character of the search pattern is first encountered by a first character in the text stream;
- means for comparing characters in the search pattern with characters in the text stream at each position of the text stream as it is shifted through the comparison cells, and producing cell match signals in the comparison cells;
- means for setting a match value initially to a selected tolerance value in a selected one of the cells;
- means for receiving a match value from a neighboring cell at the same time as a text stream character;
- means for decrementing the received match value if there is no cell match signal in the cell;
- means for storing the received and possibly decremented match value for one clocking cycle;
- means for transmitting the stored match value to the next neighboring cell in sequence, wherein the match values are propagated through the comparison cells at half the rate of shifting the text stream through the comparison cells wherein exact matches between the search pattern and strings of characters in the text stream are indicated by match values that are propagated out of the cells with a value not diminished from the tolerance value, and inexact matches are indicated by diminished match values; and
- means for detecting inexact matches in the form of extra or missing characters in each character string compared with the search pattern, wherein the detection of extra and missing characters is performed simultaneously with the detection of incorrect characters, and in each cell, and further includes means for computing two additional match values in each cell, based on the detection of an extra or missing character in the text stream, and means for selecting the greatest match value from the stored match value and the two additional match values, for transmission to the next neighboring cell in sequence.

28. A special-purpose processor as defined in claim 27, and further including:
- means for storing a first match result associated with a first search term on an additional line connecting the cells;
- means for generating a second match result relating to a second search term; and
- means for logically combining the first and second match results for output from the serially connected cells.

29. A special-purpose processor as defined in claim 28, and further including:
- means for generating additional match results associated with additional search terms, which may be logically combined with the first and second search terms in a nested arrangement.

30. A special-purpose processor as defined in claim 28, and further including:
- means for counting occurrences of selected search terms, to provide for the searching of enumerated conditions within the text stream.

31. A special-purpose processor as defined in claim 29, and further including:
- means for counting occurrences of selected search terms, to provide for the searching of enumerated conditions within the text stream.

32. A special-purpose processor as defined in claim 28, and further including:
- means for detecting boundaries of predefined text segments within the text stream; and
- means for enabling search functions to be performed only within a fixed window of one text segment.

33. A special-purpose processor as defined in claim 29, and further including:
- means for detecting boundaries of predefined text segments within the text stream; and means for enabling search functions to be performed only within a fixed window of one text segment.

34. A special-purpose processor as defined in claim 30, and further including:
means for detecting boundaries of predefined text segments within the text stream; and
means for enabling search functions to be performed only within a fixed window of one text segment.

35. A special-purpose processor as defined in claim 31, and further including:
means for detecting boundaries of predefined text segments within the text stream; and
means for enabling search functions to be performed only within a fixed window of one text segment.

36. A special-purpose processor as defined in claim 28, and further including:
means for detecting boundaries between predefined text segments within the text stream;
means for counting text segments to determine whether a search term has appeared within a specified number of text segments;
means for generating a match signal only when specified search terms have appeared in combination within the specified number of text segments.

37. A special-purpose processor as defined in claim 36, and further including:
means for reducing in number the match signals generated, by ANDing the match signals with a signal derived from the boundaries of the predefined text segments.

38. A special-purpose search processor, comprising:
a plurality (n) of serially connected pattern registers for storing a search pattern;
an equal plurality (n) of serially connected character registers, each for storing a character of a data stream to be searched;
means for shifting the data stream being searched, character-by-character through the serially connected plurality of character registers;
an equal plurality (n) of serially connected match registers, for storing match value input at a first of the match registers;
means for shifting match values along the serially connected match registers, at half the rate at which the data stream characters are shifted through the character registers, whereby a match detected between a character in the data stream and a character in the search pattern is preserved in the form of a match value that is positioned for use in a subsequent comparison between the next following character in the data stream and the next following character in the search pattern; and
match logic, including a plurality of comparators for comparing the contents of the character registers with the contents of the corresponding pattern registers, and modifying the contents of the corresponding match registers upon detection of a mismatch, whereby the match values passed through the plurality of match registers are indicative of exact and inexact matches between the search pattern and strings of characters in the data stream;
and wherein the match logic includes means for detecting inexact matches in the form of extra or missing characters in each character string compared with the search pattern, wherein the detection of extra and missing characters is performed simultaneously with the detection of incorrect characters, and in each cell, and further includes means for computing two additional match values in each cell, based on the detection of an extra or missing character in the text stream, and means for selecting the greatest match value from the stored match value and the two additional match values, for transmission to the next neighboring cell in sequence.

* * * * *